United States Patent [19]
Nishida et al.

[11] Patent Number: 5,449,722
[45] Date of Patent: Sep. 12, 1995

[54] THERMOPLASTIC RESIN COMPOSITION

[75] Inventors: Koji Nishida; Kiyoji Takagi; Hironari Sano; Motohiro Seki, all of Yokkaichi

[73] Assignee: Mitsubishi Petrochemical Co., Ltd., Tokyo, Japan

[21] Appl. No.: 210,365

[22] Filed: Mar. 18, 1994

[30] Foreign Application Priority Data

| Mar. 19, 1993 | [JP] | Japan | 5-060201 |
| Jun. 30, 1993 | [JP] | Japan | 5-162346 |
| Jun. 30, 1993 | [JP] | Japan | 5-162347 |
| Jun. 30, 1993 | [JP] | Japan | 5-162348 |

[51] Int. Cl.$^6$ .............. C08L 25/10; C08L 77/06; C08L 71/12; C08L 59/00
[52] U.S. Cl. .............. 525/98; 525/66; 525/92 F; 525/93; 525/96; 525/130; 525/132; 525/166; 525/177; 525/179; 525/240; 525/397; 525/92 R; 525/92 B; 525/92 J; 525/92 K; 524/447; 524/449; 524/451
[58] Field of Search .............. 525/98, 179, 92, 93, 525/96, 130, 177, 166, 66, 132, 240, 397; 524/448, 449, 451

[56] References Cited

U.S. PATENT DOCUMENTS

| 4,107,130 | 8/1978 | Gergen. | |
| 4,743,551 | 5/1988 | Shibuya et al. | 525/92 |
| 5,292,789 | 3/1994 | Ishida | 524/320 |
| 5,310,776 | 5/1994 | Takagi et al. | 524/474 |

FOREIGN PATENT DOCUMENTS

| 0268280 | 5/1988 | European Pat. Off. . |
| 0524705 | 1/1993 | European Pat. Off. . |
| 1149853 | 6/1992 | Japan . |

*Primary Examiner*—James J. Seidleck
*Assistant Examiner*—I. Zemel
*Attorney, Agent, or Firm*—Oblon, Spivak, McClelland, Maier & Neustadt

[57] ABSTRACT

Disclosed is a thermoplastic resin composition comprising:

30 to 97% by weight of at least one of (a) a crystalline thermoplastic resin component and (b) a non-crystalline thermoplastic resin component, 3 to 70% by weight of (c) a rubbery polymer component which is ununiformly mixed with at least one of Component (a) and Component (b) and 0 to 40% by weight of (d) an inorganic filler, wherein Component (c) forms a network and at least one of the ratio of flexural modulus of Component (a) to Component (c) and that of Component (b) to Component (c) is 5 or more.

21 Claims, 5 Drawing Sheets m = 62

(c-2)  (d-1)  (a-1)

(a-1)(d-1)

(c-2)

THERMOPLASTIC RESIN COMPOSITION

BACKGROUND OF THE INVENTION

This invention relates to a thermoplastic resin composition having low linear expansion coefficient, excellent dimensional stability and an excellent balance between impact resistance and rigidity.

In recent years, for the purpose of reducing fuel consumption by weight saving of automobiles, plastics have been frequently used as parts for automobiles, and various plastic materials have been used not only for interior parts such as an instrument panel, a console box, a glove box, a handle and a trim and exterior parts such as a protection mold, a lamp housing, a front grille, a mud guard and a side bumper, but also for a bumper, a fascia, a fender, a door panel and a part of a body for which metallic materials have been conventionally used.

As plastics used for the above parts for automobiles, there may be mentioned, for example, RIM (reaction injection molding) urethane, composite polypropylene, inorganic substance-reinforced plastics such as glass fiber-reinforced polyamide and polymer alloy materials such as polycarbonate/polybutylene terephthalate (PC/PBT) and polyphenylene ether/polyamide (PPE/PA). Among these materials, as the composite polypropylene, there have been described, for example, polypropylene type compositions in which a partially crosslinked ethylene-propylene copolymer rubber and oil are formulated into polypropylene in Japanese Provisional Patent Publications No. 145857/1978, No. 16554/1979 and No. 135847/1982, and as the polymer alloy of PPE/PA, there has been disclosed, for example, a composition in which a rubber modified with a polar group-containing compound is added as an impact modifier to a combination of polyphenylene ether and polyamide in Japanese Provisional Patent Publication No. 49753/1981. Further, for the purpose of improving a balance between low temperature impact resistance and rigidity, there has been proposed a composition comprising a modified polyphenylene ether intermediate, polyamide and an impact modifier in Japanese Provisional Patent Publication No. 19664/1989.

Further high level characteristics of a material used for a fascia, a fender and a door panel have been particularly demanded as compared with those of conventional plastic parts. There may be mentioned, for example, (1) impact resistance: a characteristic of absorbing energy at the time of crash by distortion and then recovering from distortion and a characteristic of ductile fracture by impact at low temperatures; and (2) dimensional stability by low linear expansion coefficient in order to solve the following problems. The thermal expansion degree of a coating is different from that of a plastic base material so that when a plastic molded product after coating is used under circumstances at high temperatures, the coating is peeled off or fine cracks are formed on a coated surface, whereby appearance and a design are worsened in many cases. Further, when a large-sized plastic molded product is used in combination with a molded product of other material such as wood or metal, the thermal expansion degrees of both molded products are different from each other under circumstances at high temperature so that there have been problems of a dimensional difference and failure of engagement. Thus, it has been demanded to establish techniques of providing a material which can satisfy the characteristics described in the above (1) and (2), i.e., techniques of improving impact resistance of plastics and improving dimensional stability thereof at high temperatures (techniques of controlling thermal expansion coefficient).

In a conventional plastic material for automobiles, it has been difficult to provide dimensional precision (linear expansion coefficient) at high temperatures and high level of impact resistance simultaneously. Among common countermeasures, there has been well known, for example, a method of improving impact resistance by formulating a large amount of an elastomer, but in this method, dimensional precision (linear expansion coefficient) at high temperatures is worsened. As a means of improving impact resistance by formulating a predetermined amount of an elastomer, a means of improving morphology has been generally known. This means is a method of making a domain particle size in a finely dispersed state (domain-matrix structure) finer by enhancing compatibility between different thermoplastic resins by a special blend technique or a special formulation technique, but dimensional precision (linear expansion coefficient) at high temperatures cannot be improved by this method.

Further, for the purpose of improving dimensional precision (linear expansion coefficient), a means of formulating an inorganic filler may be considered. However, in this means, a molded product is liable to be brittle so that the level of impact resistance is lowered, which shows that brittleness causes fracture particularly by impact at low temperature, and its application is extremely limited.

SUMMARY OF THE INVENTION

An object of the present invention is to provide a resin composition in which the above problems are solved, dimensional precision (linear expansion coefficient) at high temperature is excellent and a balance between impact resistance and rigidity at low temperature is excellent.

In order to solve the above problems, the present inventors have studied intensively a relation between a dispersed state and dimensional characteristics, particularly linear expansion coefficient of thermoplastic resins having different flexural moduli from each other, and consequently found that high dimensional characteristics which cannot be expected in a conventional product can be obtained not when a thermoplastic resin having smaller flexural modulus is dispersed in a particle state in the other thermoplastic resin having larger flexural modulus, but when a thermoplastic resin having smaller flexural modulus is dispersed in a net state, in other words, in a network state in the other thermoplastic resin having larger flexural modulus, to accomplish the present invention.

The present inventors have also studied intensively a relation between a dispersed state and dimensional stability, particularly linear expansion coefficient of thermoplastic resins having different flexural moduli from each other and an inorganic filler, and consequently found that high dimensional stability which cannot be expected in a conventional product can be obtained (1) not when a thermoplastic resin having smaller flexural modulus is dispersed in a particle state in the other thermoplastic resin having larger flexural modulus (domain-matrix structure), but when a thermoplastic resin having smaller flexural modulus is dispersed in a net state, in other words, in a network state in the other thermoplastic resin having larger flexural modulus, and (2) not when an inorganic filler exists in a thermoplastic resin (b) having small flexural modulus, but when an inorganic filler exists selectively in a thermoplastic resin (a) having large flexural modulus, to accomplish the present invention.

The present inventors have further studied intensively a relation between a dispersed state and dimensional stability of thermoplastic resins which are ununiformly mixed with each other, particularly a relation between linear expansion coefficient and impact resistance thereof, and consequently found that high dimensional stability and impact resistance which cannot be expected in a conventional product can be obtained not when (1) both of two thermoplastic resins among thermoplastic resins which are ununiformly mixed with each other are dispersed in a particle state in the other thermoplastic resin (sea-island structure) nor (2) one of thermoplastic resins which are ununiformly mixed with each other is dispersed in a particle state in the other thermoplastic resin and the remaining thermoplastic resin exists in the thermoplastic resin dispersed in a particle state (sea-island-lake structure), but when one of thermoplastic resins which are ununiformly mixed with each other is dispersed in a net state, in other words, in a network state, said thermoplastic resin exists at the interface of the other two thermoplastic resins and when an inorganic filler is further present, the inorganic filler component exists substantially in a crystalline resin component, to accomplish the present invention.

That is, the present invention relates to a thermoplastic resin composition which comprises:

30 to 97% by weight of at least one of (a) a crystalline thermoplastic resin component and (b) a non-crystalline thermoplastic resin component, 3 to 70% by weight of (c) a rubbery polymer component which is ununiformly mixed with at least one of Component (a) and Component (b) and 0 to 40% by weight of (d) an inorganic filler, wherein Component (c) forms a network and at least one of the ratio of flexural modulus of Component (a) to Component (c) and that of Component (b) to Component (c) is 5 or more.

In one of the preferred embodiments of the present invention, the thermoplastic resin composition comprises:

(a) 5 to 85% by weight of a crystalline thermoplastic resin component,
(b) 5 to 85% by weight of a non-crystalline thermoplastic resin component which is ununiformly mixed with Component (a),
(c) 10 to 60% by weight of a rubbery polymer component which is ununiformly mixed with Component (a) and Component (b) and
(d) 0 to 40% by weight of an inorganic filler, wherein Component (c) forms a network and exists substantially at the interface of Component (a) and Component (b).

The present invention particularly relates to the thermoplastic resin composition described above in which a number m of regions of Component (a) and/or Component (b) which are enclosed with the network of Component (c) existing in a square having a side length of 1 μm is a number which makes the average value of the index R of the following formula. (I) 0.9 or less, $$R = \frac{1}{\sqrt{2} \sqrt{m}} \cdot \frac{(2+\sqrt{2})^{1+\sqrt{m}} + (2-\sqrt{2})^{1+\sqrt{m}} - 2^{2+\sqrt{m}}}{(2+\sqrt{2})^{\sqrt{m}} - (2-\sqrt{2})^{\sqrt{m}}} \quad (I)$$

Here, a method of confirming a dispersed state of one thermoplastic resin in the other thermoplastic resin, which is the important subject matter of the present invention and a method of measuring the number m are described. First, for example, after a part of a molded product or a pellet obtained by kneading is cut off and dyed with $RuO_4$ or $OsO_4$, an extremely thin section is prepared by using an ultramicrotome Ultracut N (trade name, manufactured by Reicherr Co.) and observed by a transmission type electron microscope JEM100CX (trade name, manufactured by Nihon Denshi Co.). The rubbery polymer (c) is observed as a black portion by dyeing so that its existing state can be observed easily. Further, by analyzing the observed photograph by an image-processing and analyzing device SPICCA 2 (trade name, manufactured by Nihon Avionics Co.), the dispersed state of the rubbery polymer (c) is evaluated to give two values. The number m of regions of the other resin(s) which are enclosed with the network of the rubbery polymer (c) is measured and R is calculated according to the formula (I). The analysis described above is carried out at 10 or more, preferably 30 or more representative positions of the molded product or the pellet to determine the average value of R, and the average value is used as an index of the network structure.

DESCRIPTION OF THE PREFERRED EMBODIMENTS

Figure 1:
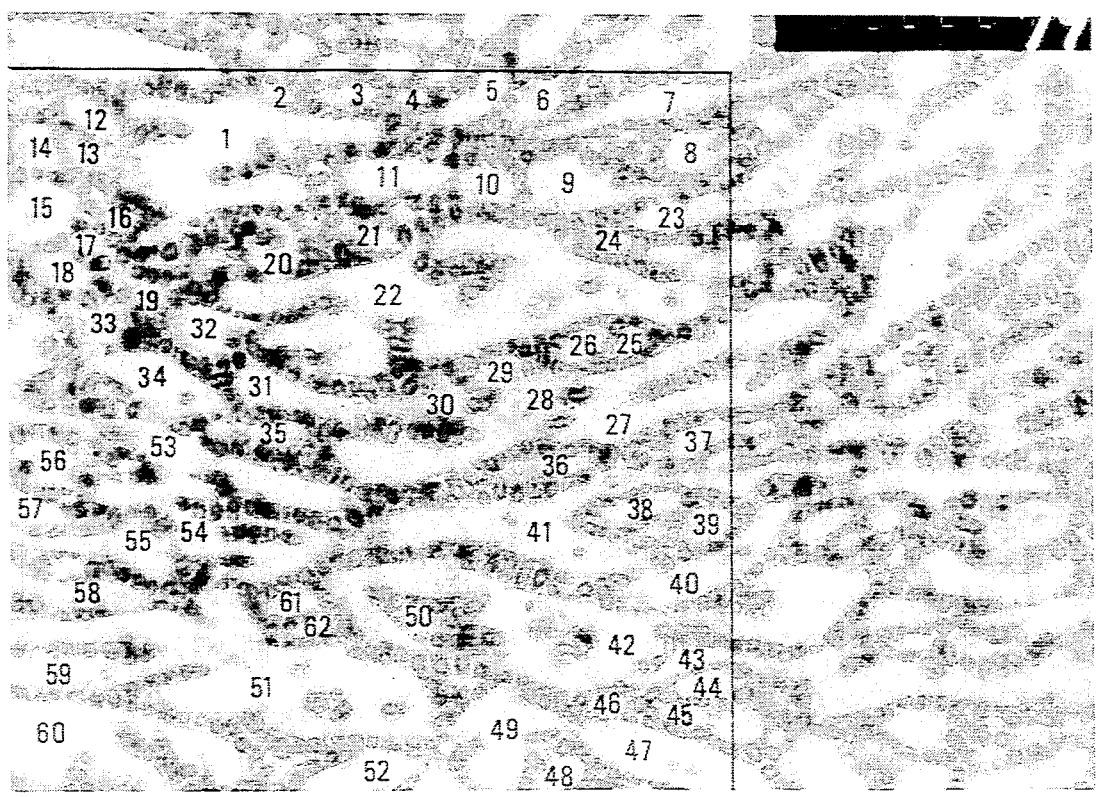
FIG. 1 is a transmission type electron microscope photograph (75,000 magnifications) of the composition obtained in Example 2.

In the following, the present invention is explained in detail.

Crystalline thermoplastic resin (a)

The crystalline thermoplastic resin (a) is a thermoplastic resin having non-glass-like properties which show a clear crystalline structure or a molecular structure which can be crystallized, and also having heat of melting which can be measured and a clear melting point. The melting point and heat of melting can be measured by using a differential scanning calorimeter (e.g. DSC-II (trade name) manufactured by PERKIN-ELMER Co.). That is, by using this device, heat of melting is measured by heating a sample to a temperature which is a melting point or higher than estimated at a temperature-elevating rate of 10° C. per 1 minute, cooling the sample to 20° C. at a cooling rate of 10° C. per 1 minute, leaving the sample to stand for about 1 minute and then heating the sample at a temperature-elevating rate of 10° C. per 1 minute. Among the values of heat of melting measured in a cycle of elevating temperature and lowering temperature, the constant value within experimental error is used. The crystalline thermoplastic resin (a) to be used in the present invention is defined to have heat of melting measured by the above method of 1 calorie/gram or more.

Specific examples of the crystalline thermoplastic resin (a) are shown below.

(a-1) Saturated polyester

As an example of the crystalline thermoplastic resin (a) to be used in the present invention, there may be mentioned a saturated polyester and various polyesters may be used.

As one example thereof, there may be mentioned a thermoplastic polyester prepared by condensing a dicarboxylic acid or a lower alkyl ester thereof, an acid halide or an acid anhydride derivative and a glycol or a divalent phenol according to a conventional method.

As a specific example of an aromatic or aliphatic dicarboxylic acid suitable for preparing the above polyester, there may be mentioned oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid or 2,7-naphthalenedicarboxylic acid, or a mixture of these carboxylic acids.

As an aliphatic glycol suitable for preparing the saturated polyester, there may be mentioned a straight alkylene glycol having 2 to 12 carbon atoms, for example, ethylene glycol, 1,3-propylene glycol, 1,4-butanediol, 1,6-hexanediol and 1,12-dodecanediol. As an aromatic glycol, there may be mentioned p-xylylene glycol, and as a divalent phenol, there may be mentioned pyrocatechol, resorcinol, hydroquinone or alkyl-substituted derivatives of these compounds. Other suitable glycols may include 1,4-cyclohexanedimethanol.

As other preferred saturated polyester, there may be mentioned a polyester obtained by ring opening polymerization of a lactone. Examples thereof may include polypivalolactone and poly($\epsilon$-caprolactone).

Further, as other preferred saturated polyester, there may be mentioned a thermotropic liquid crystal polymer (TLCP) which forms liquid crystal in a melted state. As a representative TLCP which is commercially available, there may be mentioned X7G (trade name) produced by Eastman Kodak Co., Xydar (trade name) produced by Datoco Co., Ekonol (trade name) produced by Sumitomo Kagaku Co. and Vectra (trade name) produced by Celanese Co.

Among the saturated polyesters described above, polyethylene terephthalate (PET), polybutylene terephthalate (PBT), polyethylene naphthalate (PEN), poly(1,4-cyclohexanedimethylene terephthalate) (PCT) and the thermotropic liquid crystal polymer are saturated polyesters preferably used in the thermoplastic resin composition of the present invention.

The saturated polyester to be used in the present invention has an intrinsic viscosity measured at 20° C. in a mixed solution of phenol/1,1,2,2-tetrachloroethane=60/40% by weight of preferably 0.5 to 5.0 dl/g, more preferably 1.0 to 4.0 dl/g, particularly preferably 2.0 to 3.5 dl/g. If the intrinsic viscosity is less than 0.5 dl/g, impact resistance is insufficient, while if it exceeds 5.0 dl/g, moldability is insufficient.

(a-2) Polyamide

As an example of the crystalline thermoplastic resin (a), there may be mentioned a polyamide, and the polyamide to be used in the present invention is a polyamide which has a —CO—NH— bond in a polymer main chain and can be melted by heating. As a representative example thereof, there may be mentioned nylon 4, nylon 6, nylon 6, 6, nylon 4,6, nylon 12 and nylon 6,10 (all trade names).

A preferred polyamide is nylon 6 or nylon 6, 6, and a particularly preferred polyamide is nylon 6.

The polyamide to be used in the present invention preferably has a relative viscosity (measured in 98% conc. sulfuric acid of 25° C.) of 2.0 to 8.0.

(a-3) Polyolefin

As an example of the crystalline thermoplastic resin (a), there may be mentioned a polyolefin. The polyolefin to be used in the present invention is preferably a homopolymer of an $\alpha$-olefin such as ethylene, propylene, butene-1, pentene-1, hexene-1, 3-methylbutene-1, 4-methylpentene-1, heptene-1 and octene-1, a random or block copolymer of the above $\alpha$-olefins, a random, graft or block copolymer of a half weight or more of the above $\alpha$-olefin and other unsaturated monomer, a polymer obtained by subjecting the above olefin type polymer to oxidation, halogenation or sulfonation, a polymer at least partially showing crystallizability derived from a polyolefin or a polymer having a crystallinity of 20% or more. The above polyolefins may be used singly or in combination of two or more.

As an example of the other unsaturated monomer, there may be mentioned an unsaturated carboxylic acid or a derivative thereof such as acrylic acid, methacrylic acid, maleic acid, iraconic acid, methyl acrylate, ethyl acrylate, methyl methacrylate, maleic anhydride, arylmaleic acid imide and alkylmaleic acid imide; a vinyl ester such as vinyl acetate and vinyl butyrate; an aromatic vinyl compound such as styrene and methylstyrene; a vinyl silane such as vinyl trimethylmethoxysilane and $\gamma$-methacryloyloxypropyltrimethoxysilane; or a non-conjugated diene such as dicyclopentadiene and 4-ethylidene-2-norbornene.

The polyolefin can be obtained by polymerization or modification according to a known method, but it may be selected suitably from commercially available products.

Among them, a homopolymer of propylene, butene-1, 3-methyl-butene-1 or 4-methylpentene-1, or a copolymer containing a half weight or more of the above monomer is preferred, and a crystalline propylene type polymer, i.e., a crystalline propylene homopolymer, a crystalline propylene-α-olefin block or random copolymer, a copolymer comprising the above crystalline propylene polymer and an α-olefin type rubber, i.e., plural rubbery α-olefins, or a mixture of plural α-olefins and a non-conjugated diene is particularly preferred from the point of a balance of mechanical properties.

The above crystalline propylene type polymer or the mixture of the above crystalline propylene type polymer and the α-olefin type rubber preferably has a melt flow rate (MFR) (230° C., load: 2.16 kg) of 0.01 to 250 g/10 min, more preferably 0.05 to 150 g/10 min, particularly preferably 0.1 to 50 g/10 min. If MFR is lower than the above range, molding processability is insufficient, while if it exceeds the above range, the level of a balance of mechanical properties is low.

In the present invention, there may be included the crystalline propylene type polymer and the mixture of the crystalline propylene type polymer and the α-olefin type rubber each having a higher molecular weight which is changed by heat treatment in the presence of a radical polymerization initiator, for example, an organic peroxide so as to have MFR in the above range.

As an example of the crystalline thermoplastic resin (a) of the present invention may include a polyphenylene sulfide (PPS) and the PPS to be used in the present invention is a crystalline resin having a recurring unit represented by the formula:

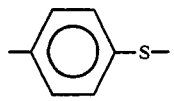

as a main constitutional unit.

In the present invention, preferred are polymers mainly comprising the above recurring unit:

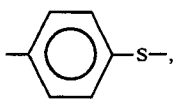

that is,
a polymer consisting of the recurring unit:

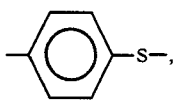

or a polymer containing the recurring unit preferably in an amount of 80 mole % or more, more preferably 90 mole % or more in view of physical properties such as heat resistance.

When the PPS is not substantially constituted only by the above recurring unit:

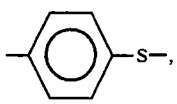

the reminder (for example, up to 20 mole %) may be supplied by the following copolymerizable recurring units, for example, represented by:

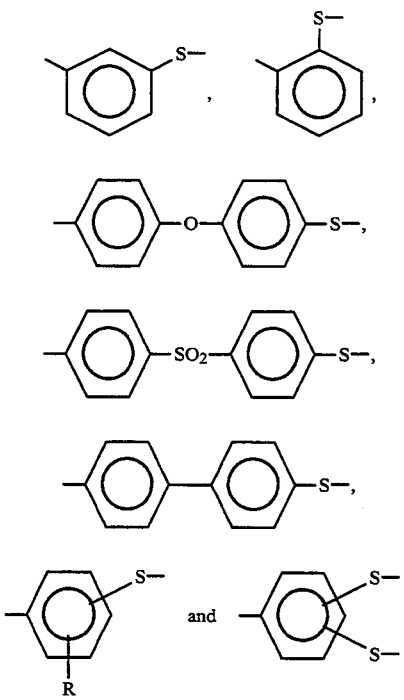

wherein R represents an alkyl group, preferably a lower alkyl group having 1 to 6 carbon atoms.

The PPS to be used in the present has basically and preferably a linear structure in view of physical properties of a molded product. However, a cross-linked polymer material obtained by using an effective amount of a cross-linking agent such as a trihalobenzene during polymerization or a thermally cross-linked polymer material obtained by heating a polymer in the presence of oxygen may be used in an amount which does not impair the physical properties of the PPS.

The PPS to be used in the composition of the present invention preferably has a melt viscosity at 300° C. in the range of 100 to 20,000 poise, more preferably 500 to 10,000 poise. If the melt viscosity is less than 100 poise, flowability is too high for molding the composition. While if it exceeds 20,000 poise, flowability is contrary too low whereby molding of the composition is also difficult.

The PPS to be used in the present invention may be prepared by any optional method so long as it does not contrary to the objects of the present invention, but the PPS which satisfies the aforesaid conditions can be prepared, for example, according to the method for preparing a polymer having a relatively small molecular weight as described in Japanese Patent Publication No. 3368/1970, the method for preparing a linear polymer having a relatively high molecular weight or the method for obtaining a cross-linked polymer by heating a low molecular weight polymer in the presence of oxygen as described in Japanese Patent Publication No. 12240/1977, or modifying the resulting polymer, if necessary.

Also, the PPS may be treated by hot water, if necessary, e.g., when a fibrous filler is used.

As an example of the crystalline thermoplastic resin (a) other than the above examples, there may be mentioned a polyacetal (POM), a fluorine resin and polyether ether ketone, but a saturated polyester, a polyamide, a polyolefin, a polyphenylene sulfide and a polyacetal are preferred, and more preferably a saturated polyester and a polyamide.

The crystalline thermoplastic resin (a) to be used in the present invention may be used in combination of two or more.

Non-crystalline thermoplastic resin (b)

The non-crystalline thermoplastic resin (b) is a thermoplastic resin generally having glass-like properties and showing a glass transition temperature when it is heated. In the present invention, it is preferred to use a non-crystalline thermoplastic resin having a glass transition temperature of 50° C. or higher. The non-crystalline thermoplastic resin does not show a clear melting point nor heat of melting which can be measured, but in the present invention, a thermoplastic resin showing some crystallizability when it is slowly cooled is included and a thermoplastic resin showing crystallizability within the range which does not impair the effect of the present invention significantly is also included. The glass transition temperature, melting point and heat of melting can be measured by using a differential scanning calorimeter, for example, by using the device and measurement method described in <Crystalline thermoplastic resin (a)>. The non-crystalline thermoplastic resin (b) to be used in the present invention is defined to have heat of melting measured by the above method of less than 1 calorie/gram.

Specific examples of the non-crystalline thermoplastic resin (b) are shown below.

(b-1) Polyphenylene ether

As an example of the non-crystalline thermoplastic resin (b) to be used in the present invention, there may be mentioned a polyphenylene ether, and the polyphenylene ether is a homopolymer or copolymer having a structure represented by the formula (II):

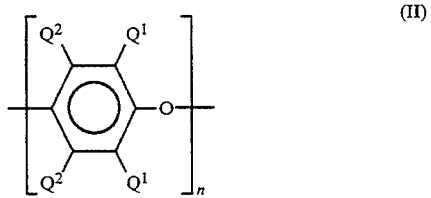

wherein $Q^1$s each represent a halogen atom, a primary or secondary alkyl group, an aryl group, an aminoalkyl group, a halohydrocarbon group, a hydrocarbonoxy group or a halohydrocarbonoxy group; $Q^2$s each represent a hydrogen atom, a halogen atom, a primary or secondary alkyl group, an aryl group, a halohydrocarbon group, a hydrocarbonoxy group or a halohydrocarbonoxy group; and n represents an integer of 10 or more.

As a preferred example of the primary alkyl group represented by $Q^1$ or $Q^2$, there may be mentioned methyl, ethyl, n-propyl, n-butyl, n-amyl, isoamyl, 2-methylbutyl, n-hexyl, 2,3-dimethylbutyl, 2-, 3- or 4-methylpentyl or heptyl. As a preferred example of the secondary alkyl group, there may be mentioned isopropyl, sec-butyl or 1-ethylpropyl. In many cases, $Q^1$ is an alkyl group or a phenyl group, particularly an alkyl group having 1 to 4 carbon atoms, and $Q^2$ is a hydrogen atom.

As a preferred homopolymer of the polyphenylene ether, there may be mentioned, for example, a homopolymer comprising a 2,6-dimethyl-1,4-phenylene ether unit. As a preferred copolymer, there may be mentioned a random copolymer comprising a combination of the above unit and a 2,3,6-trimethyl-1,4-phenylene ether unit. A number of preferred homopolymers or random copolymers are described in patent specifications and literatures. For example, a polyphenylene ether having a molecular structure portion which improves characteristics such as molecular weight, melt viscosity and/or impact resistance is also preferred.

The polyphenylene ether to be used in the present invention preferably has an intrinsic viscosity measured at 30° C. in chloroform of 0.2 to 0.8 dl/g, more preferably an intrinsic viscosity of 0.2 to 0.5 dl/g, particularly preferably an intrinsic viscosity of 0.25 to 0.4 dl/g.

If the intrinsic viscosity is less than 0.2 dl/g, impact resistance of a composition is insufficient, while if it exceeds 0.8 dl/g, moldability of a composition and appearance of a molded product are insufficient.

(b-2) Polycarbonate

As an example of the non-crystalline thermoplastic resin (b), there may be mentioned a polycarbonate (PC), and as the polycarbonate to be used in the present invention, there may be mentioned an aromatic polycarbonate, an aliphatic polycarbonate and an aliphatic-aromatic polycarbonate. Among them, preferred are aromatic polycarbonates comprising 2,2-bis (4-oxyphenyl) alkane type, bis (4-oxyphenyl) ether type, bis (4-oxyphenyl) sulfone, sulfide or sulfoxide type bisphenols. If necessary, a polycarbonate comprising bisphenols substituted by halogens may be used.

The molecular weight of the polycarbonate to be used is not particularly limited, but it is generally 10,000 or more, preferably 20,000 to 40,000 in terms of weight average molecular weight.

As an example of the non-crystalline thermoplastic resin (b) other than the above examples, there may be mentioned a polystyrene type resin, an acrylonitrile-butadiene-styrene (ABS) resin, aromatic polysulfone, aromatic polyether sulfone, a low crystalline or non-crystalline polyamide containing a monomer component such as aromatic diamine and aromatic dicarboxylic acid, a silicon resin, polyether imide and poly(alkyl)acrylate, but a polyphenylene ether, a polycarbonate and a polystyrene type resin are preferred, and a polyphenylene ether is more preferred.

The non-crystalline thermoplastic resin (b) to be used in the present invention may be used in combination of two or more.

Rubbery polymer (c)

The rubbery polymer (c) to be used in the present invention is ununiformly mixed with Component (a) and/or Component (b). The rubbery polymer having a modulus of tension of 5,000 kg/cm² or less (measured according to ASTM D882) is preferred.

The thermoplastic resin to be used as Component (b) in the present invention has flexural modulus smaller than that of Component (a), and the flexural modulus ratio (Ma/Mb) of Component (a) to Component (b) is 5 or more, preferably 10 or more.

As the rubbery polymer, there may be mentioned, for example, a hydrogenated product of a block copolymer comprising an aromatic vinyl compound polymer block A and a conjugated diene compound polymer block B. The hydrogenated product of the block copolymer is a block copolymer in which aliphatic unsaturated bonds of the chain block B derived from conjugated diene of an aromatic vinyl compound-conjugated diene block copolymer having a structure comprising at least one chain block A derived from an aromatic vinyl compound and at least one block B are reduced by hydrogenation. The sequence of the blocks A and B may include a linear structure and a branched structure (radical tereblock). In a part of these structures, a random chain derived from a random copolymer portion of an aromatic vinyl compound and conjugated diene may be included. Among the sequences, a sequence having a linear structure is preferred, and a sequence having a diblock structure is more preferred.

The aromatic vinyl compound is preferably styrene, α-methylstyrene, vinyl toluene or vinyl xylene, more preferably styrene.

The conjugated diene is preferably 1,3-butadiene or 2-methyl-1, 3-butadiene.

The ratio of the recurring unit derived from the aromatic vinyl compound in the hydrogenated product of the aromatic vinyl compound-conjugated diene block copolymer is preferably 10 to 80% by weight, more preferably 15 to 60% by weight.

In the aliphatic chain portions of these block copolymers, the ratio of unsaturated bonds derived from the conjugated diene and not hydrogenated to remain as such is preferably 20% or less, more preferably 10% or less. Further, about 25% or less of aromatic unsaturated bonds derived from the aromatic vinyl compound may be hydrogenated.

As a measure of the molecular weights of these hydrogenated block copolymers, a viscosity value at 25° C. in a toluene solution is preferably 30,000 to 10 cP (concentration: 15% by weight), more preferably 10,000 to 30 cP. If the value exceeds 30,000 cP, molding processability of a final composition is insufficient, while if it is less than 10 cP, a mechanical strength level of a final composition is undesirably low.

Further, as the rubbery polymer to be used in the present invention, there may be mentioned a polyolefin type rubbery copolymer, preferably an ethylene-propylene copolymer type rubber and an ethylene-butene copolymer type rubber, specifically an amorphous random copolymer containing ethylene and propylene or ethylene and butene as main components, particularly said amorphous random copolymer which is copolymerized with non-conjugated diene. As the non-conjugated diene, there may be used dicyclopentadiene, 1,4-hexadiene, cyclooctadiene, methylnorbornene and 5-ethylidene-2-norbornene.

As a representative ethylene-propylene copolymer type rubber, there may be mentioned an ethylene-propylene copolymer type rubber prepared by carrying out polymerization using a vanadium type catalyst comprising a vanadium compound such as vanadium chloride and vanadium oxychloride and an organic aluminum compound such as triethylaluminum sesquichloride. The copolymer rubber prepared by using such a catalyst system generally has good randomness and preferred is a copolymer rubber showing almost no crystallizability and having a crystallinity of less than 20%.

Also, those in which these rubbery polymers are subjected to graft polymerization with an α,β-unsaturated dicarboxylic acid such as maleic acid, monomethyl maleate, maleic anhydride, iraconic acid, monomethyl itaconate, itaconic anhydride and fumaric acid; an alicyclic carboxylic acid such as endo-bicyclo[2.2.1]-5-hepten-2,3-dicarboxylic acid or a derivative thereof; a compound having a glycidyl group and a (meth)acrylate group in the same molecule; a compound having a glycidyloxy group and an acrylamide group in the same molecule; an unsaturated monomer having an alicyclic epoxy group; or an epoxy-containing compound such as butylglycidyl maleate, by utilizing a peroxide, ionized radiation or UV rays may be used.

The rubbery polymer (c) described above preferably has a flexural modulus (JIS K 7203) of 10,000 kg/cm$^2$ or less, more preferably 8,000 kg/cm$^2$ or less, particularly preferably 6,000 kg/cm$^2$ or less.

The rubbery polymer (c) to be used in the present invention may be used singly or in combination of two or more.

The rubbery polymer (c) to be used in the present invention is ununiformly mixed with Component (a) and/or Component (b) and preferably has compatibility with Component (a) and/or Component (b). The compatibility herein mentioned refers to compatibility obtained chemically, for example, by graft or block polymerization, or physically, for example, by changing interface characteristics of dispersed phases and/or heightening dispersion thereof.

Inorganic filler (d)

The inorganic filler (d) to be used in the present invention is preferably an inorganic filler having an average particle size of 5 μm or less, preferably 4 μm or less, particularly preferably 2.5 μm or less. The average particle size herein mentioned refers to an average maximum particle size of a primary particle measured by observation using an electron microscope. The shape of the inorganic filler may be various shapes such as a sphere, a cube, a particle, a needle, a plate and a fiber, and any shape may be used. Among the above shapes, a plate shape is preferred from the point of an effect of improving a physical property balance between rigidity and impact resistance and dimensional stability.

As the inorganic filler (d), there may be mentioned metallic elements of the Group I to VIII of the periodic table (e.g. Fe, Na, K, Cu, Mg, Ca, Zn, Ba, Al and Ti) or a silicon element, an oxide, hydroxide, carbonate, sulfate, silicate or sulfite thereof and various viscous minerals comprising the above compounds, and others, specifically, for example, titanium oxide, zinc oxide, barium sulfate, silica, calcium carbonate, iron oxide, alumina, calcium titanate, aluminum hydroxide, magnesium hydroxide, calcium hydroxide, magnesium carbonate, calcium sulfate, sodium sulfate, calcium sulfite, calcium silicate, clay, wallastonite, glass beads, glass powder, siliceous sand, silica rock, silica flour, white sand, diatomaceous earth, white carbon, iron powder and aluminum powder. The above fillers may be used in combination of two or more without any problem.

Among them, talc, mica, kaolin, clay and diatomaceous earth each having an average particle size of 5 μm or less are particularly preferred since they are plate-shaped.

The inorganic filler (d) may be used without treatment. However, for the purpose of heightening affinity for a resin or interface bonding power, the inorganic filler (d) may be treated by using an inorganic surface-treating agent, i.e., a higher aliphatic acid or a derivative thereof such as an ester or salt thereof (e.g. stearic acid, oleic acid, palmitic acid, calcium stearate, magnesium stearate, aluminum stearate, stearic acid amide, ethyl stearate, methyl stearate, calcium oleate, oleic acid amide, ethyl oleate, calcium palmitate, palmitic acid amide and ethyl palmirate); a coupling agent (e.g. vinyl trimethoxysilane, vinyl triethoxysilane, vinyl triacetoxysilane, γ-chloropropyltrimethoxysilane, γ-aminopropyltrimethoxysilane, γ-methacryloxypropyltrimethoxysilane, β-(3,4-epoxycyclohexyl)ethyltrimethoxysilane and γ-glycidoxypropyltrimethoxysilane); and a titanium coupling agent (e.g. isopropyltriisostearoyl titanate, isopropyltrilaurylmyristyl titanate, isopropylisostearoyldimethacryl titanate and isopropyltridiisooctyl phosphate titanate).

The inorganic filler (d) to be used in the present invention may be glass fiber preferably having an average diameter of 15 μm or less, more preferably 1 to 10 μm from the point of further improving a balance of physical properties (heat resistant rigidity and impact strength) and the point of further reducing warping distortion caused by molding and warping distortion caused by heating again.

The length of said glass fiber is not particularly limited, but a chopped strand with a roving supply of about 1 to 8 mm is also preferred. In the case of the chopped strand, the number of the bundled glass fibers is generally preferably 100 to 5,000. A pulverized product of a strand which is the so-called milled fiber or glass powder may be used so long as its length after kneading is 0.1 mm or longer on average, and a strand on a continuous single fiber type sliver may be also used. The composition of a glass material is preferably a composition containing no alkali and one example thereof is E glass.

If the average diameter of the glass fiber exceeds 15 μm, the degree of improving mechanical strength is small and the rate of warpage caused by molding is large.

Here, the average diameter is observed by an electron microscope or the like, and "average" means "number average".

Here, a bundling agent generally comprises a film-forming agent, a surfactant, a softener, an antistatic agent and a lubricant, but it may comprise a surface-treating agent alone.

When the above glass fiber is used, various coupling agents may be used for the purpose of heightening affinity for a resin or interface bonding power.

The coupling agent may generally include silane type, chrome type and titanium type coupling agents. Among them, a silane type coupling agent including an epoxysilane such as γ-glycidoxypropyltrimethoxysilane; vinyl trichlorosilane; or an aminosilane such as γ-aminopropyltriethoxysilane is preferred. Here, from the point of improving mechanical strength and kneadability, it is preferred to carry out treatment using various nonionic, cationic or anionic surfactants or a dispersant such as aliphatic acid, metal soap and various resins, in combination with treatment using the coupling agent.

Composition ratio of constitutional components

The composition ratio of Components (a) to (d) described above with the total weight of Components (a), (b), (c) and (d) being 100% by weight is shown below.

The ratio of the sum of Components (a) and (b) is 30 to 97% by weight, preferably 35 to 85% by weight, more preferably 10 to 65% by weight when at least one of Components (a) and (b) is contained. If the ratio of the sum of Components (a) and (b) is less than 30% by weight, dimensional stability (linear expansion coefficient) and rigidity are insufficient, while if it exceeds 97% by weight, dimensional stability (linear expansion coefficient) and impact resistance are insufficient.

The ratio of Component (a) is preferably 5 to 85% by weight, more preferably 7 to 75% by weight, most preferably 10 to 65% by weight when Component (b) is contained. If the ratio of Component (a) is less than 5% by weight, dimensional stability (linear expansion coefficient) and rigidity are insufficient, while if it exceeds 85% by weight, dimensional stability (linear expansion coefficient) and impact resistance are insufficient.

The ratio of Component (b) is preferably 5 to 85% by weight, more preferably 10 to 70% by weight, most preferably 15 to 50% by weight when Component (a) is contained. If the ratio of Component (b) is less than 5% by weight, dimensional stability (linear expansion coefficient) and rigidity are insufficient, while if it exceeds 80% by weight, dimensional stability (linear expansion coefficient) and impact resistance are insufficient.

The ratio of Component (c) is 3 to 70% by weight, preferably 15 to 65% by weight when at least one of Components (a) and (b) is contained. When both of Components (a) and (b) are contained, it is 10 to 60% by weight, preferably 10 to 55% by weight, more preferably 12 to 40% by weight. If the ratio of Component (c) is less than the above lower limits, dimensional stability and impact resistance are insufficient, while if it exceeds the above upper limits, dimensional stability and rigidity are insufficient.

The ratio of Component (d) is 0 to 40% by weight, preferably 0 to 35% by weight, more preferably 0 to 25% by weight. If the ratio of Component (d) exceeds 40% by weight, impact resistance is insufficient.

Structure of thermoplastic resin composition

The thermoplastic resin composition of the present invention has a structure that when the thermoplastic resin is one of Component (a) and Component (b), Component (c) exists in Component (a) and/or Component (b) in a network state; and the average value of the index R obtained by measuring the number m of matrix regions of Component (a) and/or Component (b) enclosed with the network existing in a square having a side length of 1 μm by subjecting a photograph observed by an electron microscope to image processing, and then calculating the index R according to the formula (I):

$$R = \frac{1}{\sqrt{2}\sqrt{m}} \cdot \frac{(2+\sqrt{2})^{1+\sqrt{m}} + (2-\sqrt{2})^{1+\sqrt{m}} - 2^{2+\sqrt{m}}}{(2+\sqrt{2})^{\sqrt{m}} - (2-\sqrt{2})^{\sqrt{m}}} \quad (I)$$

is 0.9 or less. The average value of R is preferably 0.85 or less, more preferably 0.80 or less.

Further, it is preferred that when the thermoplastic resin comprises Components (a) and (b), Component (c) exists substantially at the interface of Component (a)

and Component (b), and preferably 80% or more, more preferably 95% or more of Component (c) exists at the interface of Component (a) and Component (b). When Component (c) exists in Component (a) and/or Component (b), dimensional stability is insufficient.

It is preferred that when the thermoplastic resin comprises Components (a) and (b) and Component (d) exists, Component (d) exists substantially in Component (a), and preferably 80% or more, more preferably 95% or more of Component (d) exists in Component (a). When Component (d) exists in the component other than Component (a), dimensional stability and rigidity are insufficient.

The specific method for making the inorganic filler (d) contained in the crystalline thermoplastic resin (a) is not particularly limited but the following methods are preferred.
(1) The method in which Component (a) and Component (d) are previously melted or melted and kneaded to prepare a master batch, and then the master batch is mixed with other component.
(2) The method of using Component (a) which has or contains a functional group which is capable of reacting with the surface active group of Component (d), such as a maleic anhydride-modified polypropylene.
(3) The method of using Component (d) which is treated by a treating agent (such as a silane coupling agent) having a functional group capable of reacting with Component (a).

Melt shear viscosity ratio of Component (c) to Component (a) and/or Component (b)

The melt shear viscosity ratio of Component (c) to Component (a) or (b), (c)/(a) and/or (c)/(b) may preferably be less than 1.0, more preferably 0.9 or less, further preferably 0.85 or less, particularly preferably 0.8 or less.

Formation of network structure of the present invention

For forming the network structure of the present invention, the method is not particularly limited, but it is preferred that the conditions (1) and/or (2) and (3) of the following three conditions are satisfied.
(1) The melt shear viscosity ratio of Component (c)/Component (a) and the content of Component (c) (weight % of Component (c) based on the total weight of (a)+(b)+(c), including the case where (b)=0)
When the melt shear viscosity ratio of Component (c)/Component (a) is 0.1 to less than 1.0, the content of Component (c) is preferably 25 to 75% by weight, more preferably 15 to 65% by weight, when the ratio is less than 0.1, the content of Component (c) is preferably 15 to 65% by weight, more preferably 15 to 60% by weight, and when the ratio is less than 0.01, the content of Component (c) is preferably 5 to 50% by weight, more preferably 10 to 50% by weight.
(2) The melt shear viscosity ratio of Component (c)/Component (b) and the content of Component (c) (weight % of Component (c) based on the total weight of (a)+(b)+(c), including the case where (a)=0)
When the melt shear viscosity ratio of Component (c)/Component (b) is 0.1 to less than 1.0, the content of Component (c) is preferably 25 to 75% by weight, more preferably 25 to 60% by weight, when the ratio is less than 0.1, the content of Component (c) is preferably 15 to 65% by weight, more preferably 15 to 60% by weight, and when the ratio is less than 0.01, the content of Component (c) is preferably 5 to 50% by weight, more preferably 10 to 50% by weight.
(3) The melt shear viscosity ratio of Component (b)/Component (a) is 30/1 to 1/30, preferably 15/1 to 1/15, more preferably 8/1 to 1/8.

The melt shear viscosity herein mentioned refers to a shear viscosity (shearing viscosity) measured according to the method described as a reference test of JIS K 7210, i.e., by extruding a melted resin from a capillary tube at a constant rate. As a specific measurement device, there may be mentioned an elevated flow tester (Instron capillary rheometer). By using the above device, the melt shear viscosity can be measured by setting, for example, a cylinder temperature to 250° to 320° C., a nozzle diameter to 1 mm and a nozzle length to 10 mm and changing an extrusion rate.

As the melt shear viscosity, a value at a shear rate of 100 sec$^{-1}$ is used and, as the melt temperature, a substantial temperature wherein a polymer alloy is formed in a kneading machine is used.

Additional components

To the thermoplastic resin composition of the present invention, other additional components may be added. For example, a compatibilizer which makes different thermoplastic resins compatible with each other; and an antioxidant, a weather resistance improver, a nucleating agent, a flame retardant, an impact modifier, a plasticizer and a fluidity improver which have been conventionally known may be used in the thermoplastic resin. An organic peroxide may be added to the thermoplastic resin composition depending on the case. Also, various coloring agents or dispersants thereof which have been conventionally known may be used practically.

Preparation and molding method of composition

A method for obtaining the thermoplastic resin composition of the present invention is not particularly limited, and for example, a melting and mixing method or a dissolving and mixing method may be used. As a representative method of the melting and mixing method, there may be mentioned a method of using a melting and kneading machine generally used for a thermoplastic resin, for example, a single axial or plural axial kneading extruder, a roll mixer and a Banbury mixer.

The order of kneading may be carried out by effecting the whole component at the same time or may be carried out by using blended materials each of which are prepared by previously kneading several components. Also, each component may be fed from several feed ports provided to the kneading extruder at appropriate portions, respectively, and kneaded, but preferably there is the method in which Component (c) is fed from the first hopper and the reminder components are fed from the second hopper provided to an extruder at the downstream thereof, more preferably the method in which Component (c) is fed from the first hopper provided at the upstream side of the extruder, then Component (a) is fed from the second hopper provided at the downstream side from the first hopper of the extruder, and further Component (b) is fed from the third hopper provided at the downstream side from the second hopper of the same.

As the dissolving and mixing method, there may be mentioned a method of mixing the respective components dissolved or suspended in a suitable solvent.

A molding processing method of the thermoplastic resin composition of the present invention is not particularly limited, and there may be suitably used a molding method generally used for a thermoplastic resin, i.e., various molding methods such as injection molding, blow molding, extrusion molding, sheet molding, thermal molding, rotary molding, lamination molding and press molding.

EXAMPLES

The present invention is described in detail by referring to Examples. In the following, "part" means "part by weight".

EXAMPLES 1 TO 10

The following respective components were used.
Component (a):

(a-1) Saturated polyester: polybutylene terephthalate PBT128 (trade name, produced by Kanebo Co., flexural modulus (JIS K 7203): 25,000 kg/cm$^2$)

(a-2) Polyamide: Polyamide 6, MC161 (trade name, produced by Kanebo Co., relative viscosity according to JIS K 6810: 6.8, flexural modulus (JIS K 7203): 27,000 kg/cm$^2$)

(a-3) Polyolefin: a propylene-ethylene block copolymer BCSDQ (trade name, produced by Mitsubishi Petrochemical Co., Ltd., MFR according to JIS K 7210: 1.2 g/10 min, ethylene content by infrared spectroscopic analysis: 5.5% by weight, flexural modulus (JIS K 7203): 8,000 kg/cm$^2$)

(a-4) Polyacetal: Delrin 100 (trade name, produced by Du Pont Far East Co., flexural modulus (JIS K 7203): 26,000 kg/cm$^2$)

Component (b)

(b-1) PPE: Poly(2,6-dimethyl-1,4-phenylene ether) produced by way of trial by Nippon Polyether Co., intrinsic viscosity measured at 30° C. in chloroform: 0.30 dl/g, flexural modulus (JIS K 7203): 26,000 kg/cm$^2$ (b-2) Polycarbonate: Upiron (E-2000) (trade name, produced by Mitsubishi Gas Kagaku Co., flexural modulus (JIS K 7203): 23,000 kg/cm$^2$)

Component (c):

(c-1) A hydrogenated product of a aromatic vinyl-conjugated diene block copolymer (SEBS): Kraton G1652 (trade name, produced by Shell Chemical Co., flexural modulus (JIS K 7203): 2,000 kg/cm$^2$)

(c-2) A hydrogenated product of a modified aromatic vinylconjugated diene block copolymer (Modified SEBS 1):

100 parts of Kraton G1652 (trade name) produced by Shell Chemical Co., 5 parts of an epoxydized acrylamide compound Kaneka AXE (trade name, produced by Kanegafuchi Kagaku Kogyo Co.) as an unsaturated polar compound and 0.1 part of 1,3-bis(t-butylperoxyisopropyl)benzene Perkadox 14 (trade name, produced by Kayaku AKZO Co.) were sufficiently mixed by stirring using a super mixer. The mixture was melted and kneaded by using a TEX 44 biaxial extruder (trade name, manufactured by Nippon Seikosho Co.) under conditions of a setting temperature of 180° C. and a screw rotary number of 200 rpm to prepare a composition. Then, the composition was pelletized and the resulting pellets were washed with acetone and then dried under reduced pressure to obtain a modified resin. As a result of measuring an infrared absorption spectrum of the modified resin, the graft polymerization amount of the unsaturated polar compound was 1.6% by weight. The flexural modulus (JIS K 7203) was 2,000 kg/cm$^2$.

(c-3) A hydrogenated product of a maleic anhydride-modified aromatic vinyl-conjugated diene block copolymer (Modified SEBS 2): Kraton G1901X (trade name, produced by Shell Chemical Co., flexural modulus (JIS K 7203) was 1,500 kg/cm$^2$)

(c-4) Maleic anhydride-modified ethylene-propylene rubber (Modified EPR): T7711SP (trade name, produced by Nihon Synthetic Rubber Co., maleic anhdride content: 0.5 to 1% by weight, flexural modulus (JIS K 7203): 150 kg/cm$^2$)

(c-5) Ethylene-propylene rubber (EPR): EP 912P (trade name, produced by Nihon Synthetic Rubber Co., flexural modulus (JIS K 7203): 120 kg/cm$^2$)

(c-6) Modified PE:

100 parts of a linear low density polyethylene Mitsubishi Polyethylene-LL UF240 (trade name) produced by Mitsubishi Petrochemical Co., Ltd.), 3 parts of a commercially available maleic anhydride as an unsaturated polar compound and 0.1 part of 1,3-bis(t-butylperoxyisopropyl)benzene Perkadox 14 (trade name, produced by Kayaku AKZO Co.) were sufficiently mixed by stirring using a super mixer. The mixture was melted and kneaded by using a TEX 44 biaxial extruder (trade name, manufactured by Nippon Seikosho Co.) under conditions of a setting temperature of 180° C. and a screw rotary number of 200 rpm to prepare a composition. Then, the composition was pelletized and the resulting pellets were washed with acetone and then dried under reduced pressure to obtain a modified resin. As a result of measuring an infrared absorption spectrum of the modified resin, the graft polymerization amount of the unsaturated polar compound was 1.3% by weight. The flexural modulus (JIS K 7203) was 4,000 kg/cm$^2$.

Components (a), (b) and (c) shown in Table 1 were sufficiently mixed by stirring using a super mixer according to the formulation ratios shown in Table 1. The mixtures were melted and kneaded by using a TEX 44 biaxial extruder (trade name, manufactured by Nippon Seikosho Co.) under conditions of a setting temperature of 230° C. and a screw rotary number of 350 rpm to prepare compositions. The compositions were pelletized.

The pellets of the above resin compositions were subjected to injection molding by using an inline screw type injection molding machine IS-90B Model (trade name, manufactured by Toshiba Kikai Seisakusho Co.) at a cylinder temperature of 280° C. and a mold cooling temperature of 80° C. to prepare test pieces.

At injection molding, drying was carried out until immediately before injection molding by using a reduced pressure dryer under conditions of 0.1 mmHg and 80° C. for 48 hours. The injection molded test pieces were placed in a desiccator immediately after molding and allowed to stand at 23° C. for 4 to 6 days, and then evaluation tests were conducted. The results are shown in Table 2.

A photograph of the composition obtained in Example 2 taken by using a transmission type electron microscope of 75,000 magnifications is shown in FIG. 1. It can be seen that Component (b)(Modified SEBS 2 in this composition) is observed as a black portion by dyeing and forms a network structure. The handwritten numbers in FIG. 1 are the numbers m of regions of Polyamide 6 enclosed with Modified SEBS 2, and the number m per one square having a side length of 1 μm is 62.

The respective physical values and various characteristics were measured by the following methods.

(1) Dispersed state of network (Method of calculating R)

After a part of an injection molded product or a pellet obtained by kneading was cut off as a sample and dyed with $RuO_4$ or $OsO_4$, an extremely thin section was prepared by using an ultramicrotome Ultracut N (trade name, manufactured by Reicherr Co.) and observed by a transmission type electron microscope JEM100CX (trade name, manufactured by Nihon Denshi Co.). Component (b) was observed as a black portion by dyeing so that its existing state could be observed. Further, by analyzing the observed photograph by an image-processing and analyzing device SPICCA 2 (trade name, manufactured by Nihon Avionics Co.), the dispersed state of the thermoplastic resin was evaluated to give two values. The number m of matrix regions of the other resin(s) which were enclosed with the network of Component (c) was measured and R was calculated according to the formula (I). The analysis described above was carried out at the representative positions of the molded product or the pellet to determine the average value of R, and the average value was used as an index of the network structure.

(2) Three-point flexural modulus

Three-point flexural modulus was measured according to ISO R178-1974 Procedure 12 (JIS K 7203) by using an Instron tester.

(3) Izod impact strength

Izod impact strength was measured according to ISO R180-1969 (JIS K 7110) Izod impact strength with notch by using an Izod impact tester (manufactured by Toyo Seiki Seisakusho Co.)

(4) Linear expansion coefficient

Linear expansion coefficient was measured according to ASTM D696 (measurement temperature range: 23° to 80° C.).

(5) Melt shear viscosity ratio <Component (c) / (Component (a) and Component (c)/Component (b) >

Melt shear viscosity ratio of the respective components was measured according to the method described as a reference test of JIS K 7210 by using an Instron capillary rheometer.

COMPARATIVE EXAMPLE 1

Procedures were carried out in the same manner as in Examples 1 to 10 except for using (a-2) as Component (a) and the following (c-7) as Component (c) according to the formulation ratios shown in Table 1, respectively. The results are shown in Table 2.

(c-7) Modified polyolefin (Modified PN):

100 parts of a propylene-ethylene block copolymer BCSDQ (trade name, produced by Mitsubishi Petrochemical Co., Ltd.), 3 parts of maleic anhydride as an unsaturated polar compound and 0.1 part of 1,3-bis(t-butylperoxyisopropyl)benzene Perkadox 14 (trade name, produced by Kayaku AKZO Co.) were sufficiently mixed by stirring using a super mixer. The mixture was melted and kneaded by using a TEX 44 biaxial extruder (trade name, manufactured by Nippon Seikosho Co.) under conditions of a setting temperature of 230° C. and a screw rotary number of 200 rpm to prepare a composition. Then, the composition was pelletized and the resulting pellets were washed with acetone and then dried under reduced pressure to obtain a modified resin. As a result of measuring an infrared absorption spectrum of the modified resin, the graft polymerization amount of the unsaturated polar compound was 0.6% by weight. The flexural modulus (JIS K 7203) was 8,000 $kg/cm^2$.

COMPARATIVE EXAMPLE 2

Procedures were carried out in the same manner as in Examples 1 to 10 by using the respective components shown in Table 1 according to the formulation ratio shown in Table 1. The results are shown in Table 2.

COMPARATIVE EXAMPLE 3

Procedures were carried out in the same manner as in Examples 1 to 10 except for using (a-2') Polyamide 6 MC100L (trade name, produced by Kanebo Co., relative viscosity according to JIS K 6810: 2.1, flexural modulus: 27,000 $kg/cm^2$) as Component (a) and (c-1) as Component (c) according to the formulation ratios shown in Table 1, respectively. The results are shown in Table 2.

Figure 2:
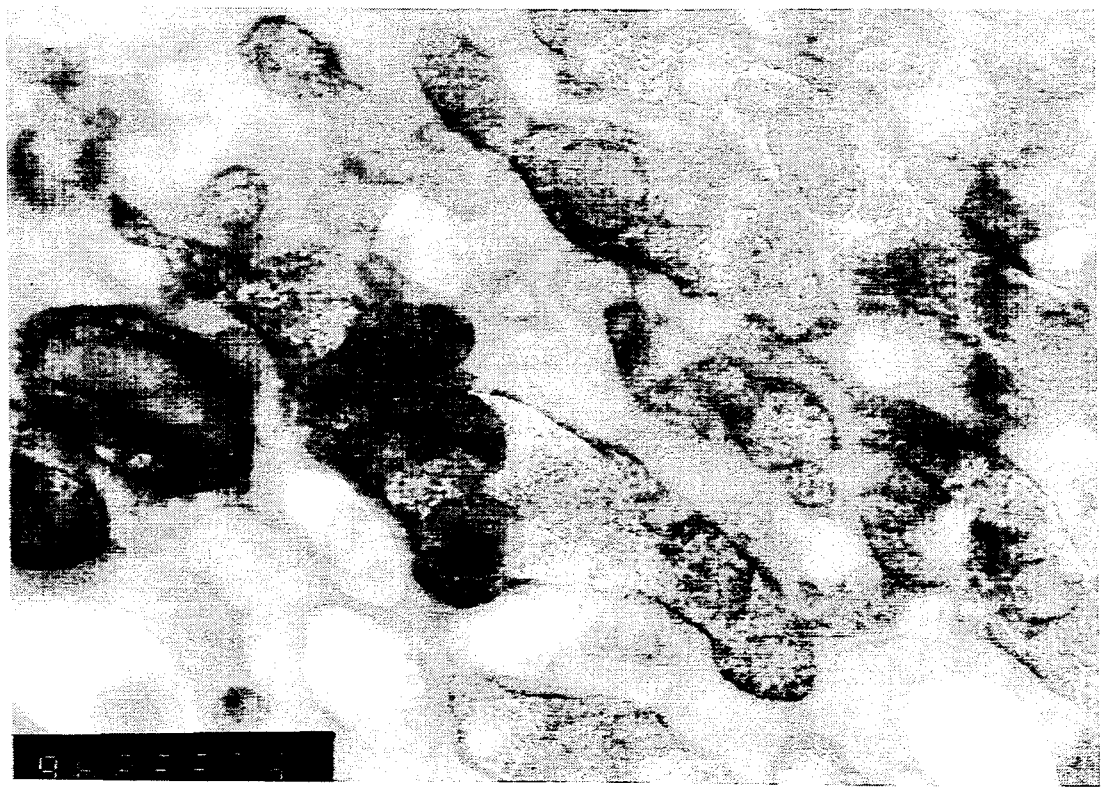
FIG. 2 is a transmission type electron microscope photograph (75,000 magnifications) of the composition obtained in Comparative example 3.

A photograph of the resulting composition taken by using a transmission type electron microscope of 75,000 magnifications is shown in FIG. 2. It can be seen that Component (c) is dispersed in a particle state and no region of Polyamide 6 enclosed with Component (c) exists. Thus, m is 0.

TABLE 1

| Composition (part by weight) | | Example 1 | 2 | 3 | 4 | 5 | 6 | 7 | 8 | 9 | 10 | Comparative example 1 | 2 | 3 |
|---|---|---|---|---|---|---|---|---|---|---|---|---|---|---|
| Component (a) | | | | | | | | | | | | | | |
| Polybutylene terephthalate | (a-1) | 60 | — | — | — | — | — | — | — | — | — | — | — | — |
| Polyamide 6 | (a-2) | — | 60 | 50 | — | — | — | — | 60 | 70 | 60 | 30 | 99 | — |
| Polyamide 6 | (a-2') | — | — | — | — | — | — | — | — | — | — | — | — | 60 |
| Polyolefin | (a-3) | — | — | — | 70 | — | — | — | — | — | — | — | — | — |
| Polyacetal | (a-4) | — | — | — | — | — | — | 70 | — | — | — | — | — | — |
| Component (b) | | | | | | | | | | | | | | |
| Polyphenylene ether | (b-1) | — | — | — | — | 60 | — | — | — | — | — | — | — | — |
| Polycarbonate | (b-2) | — | — | — | — | — | 70 | — | — | — | — | — | — | — |
| Component (c) | | | | | | | | | | | | | | |
| SEBS | (c-1) | — | — | — | — | 40 | — | — | — | — | — | — | — | 40 |
| Modified SEBS 1 | (c-2) | 40 | — | — | — | — | — | — | — | — | — | — | — | — |
| Modified SEBS 2 | (c-3) | — | 40 | — | — | — | 30 | 30 | — | 30 | — | — | 1 | — |
| Modified EPR | (c-4) | — | — | 50 | — | — | — | — | 10 | — | — | — | — | — |
| EPR | (c-5) | — | — | — | 30 | — | — | — | 30 | — | — | — | — | — |
| Modified PE | (c-6) | — | — | — | — | — | — | — | — | — | 40 | — | — | — |

TABLE 1-continued

| Composition (part by weight) | | Example 1 | 2 | 3 | 4 | 5 | 6 | 7 | 8 | 9 | 10 | Comparative example 1 | 2 | 3 |
|---|---|---|---|---|---|---|---|---|---|---|---|---|---|---|
| Modified PN | (c-7) | — | — | — | — | — | — | — | — | — | — | 70 | — | — |
| Flexural modulus ratio Ma/Mc or Mb/Mc | | 12.5 | 18.0 | 180 | 66.7 | 13.0 | 15.3 | 17.3 | 18.0 | 18.0 | 7 | 3.4 | 18.0 | 13.5 |

TABLE 2

| Evaluation results | Example 1 | 2 | 3 | 4 | 5 | 6 | 7 | 8 | 9 | 10 | Comparative example 1 | 2 | 3 |
|---|---|---|---|---|---|---|---|---|---|---|---|---|---|
| Network structure R | 0.80 | 0.36 | 0.40 | 0.68 | 0.75 | 0.75 | 0.85 | 0.82 | 0.75 | 0.87 | ∞*1 | ∞ | ∞ |
| Three-point flexural modulus 23° C. (kg/cm$^2$) | 8,000 | 9,000 | 3,600 | 6,000 | 12,000 | 10,000 | 13,000 | 7,200 | 12,500 | 12,500 | 14,000 | 26,000 | 13,300 |
| Izod impact strength 23° C. (kg · cm/cm$^2$) | NB*2 92 | NB 98 | NB 99 | NB 70 | NB 60 | NB 80 | NB 58 | NB 63 | NB 98 | NB 98 | 4 | 7 | 10 |
| −30° C. (kg · cm/cm$^2$) | NB 90 | NB 93 | NB 100 | NB 55 | NB 40 | NB 40 | NB 38 | NB 97 | NB 40 | NB 40 | 2 | 3 | 4 |
| Linear expansion coefficient × 10$^{-5}$ 1/°C.) | 12 | 9 | 6 | 10 | 6 | 7 | 11 | 13 | 11 | 11 | 15 | 12 | 13 |
| Melt shear viscosity ratio Component (c)/(a) or Component (c)/(b) | 0.6 | 0.07 | 0.3 | 0.8 | 0.5 | 0.08 | 0.4 | 0.2 | 0.07 | 0.07 | 12 | 0.07 | 5 |

*1: ∞ means that a network structure was not formed.
*2: NB means that the test piece was not broken.

From the results of the evaluation tests described above, it can be understood that the thermoplastic resin composition of the present invention in which Component (c) is dispersed in a network state in Component (a) or Component (b) has excellent dimensional stability (low linear expansion coefficient) and impact resistance. Thus, the thermoplastic resin composition of the present invention can be used for various purposes, and it can be an industrially useful material.

EXAMPLES 11 TO 17

The following respective components were used.
Component (a):
(a-1) Saturated polyester: polybutylene terephthalate PBT128 (trade name, produced by Kanebo Co.)
(a-2″) Polyamide: Polyamide 6 MC112L (trade name, produced by Kanebo Co., relative viscosity according to JIS K 6810: 2.7)
(a-3) Polyolefin: a propylene-ethylene block copolymer BC8DQ (trade name, produced by Mitsubishi Petrochemical Co., Ltd., MFR according to JIS K 7210: 1.2 g/10 min, ethylene content by infrared spectroscopic analysis: 5.5% by weight)
Component (b):
(b-1) Polyphenylene ether: poly(2,6-dimethyl-1,4-phenylene ether)(produced by way of trial by Nippon Polyether Co., intrinsic viscosity measured at 30° C. in chloroform: 0.30 dl/g)
(b-2) Polycarbonate: polycarbonate Upiron E-2000 (trade name, produced by Mitsubishi Gas Kagaku Co.)
(b-3) Modified polyphenylene ether:
100 parts of Polyphenylene ether (b-1), 2 parts of a commercially available maleic anhydride and 4 parts of Polyamide 6 (a-2″) were sufficiently mixed by stirring using a super mixer. The mixture was melted and kneaded by using a TEX 44 biaxial extruder (trade name, produced by Nippon Seikosho Co.) under kneading conditions of a setting temperature of 250° C. and a screw rotary number of 200 rpm to prepare a resin composition. Then, the resin composition was pelletized and the resulting pellets were dried under reduced pressure to prepare a modified polyphenylene ether.

Component (c):
(c-1) SEBS: a hydrogenated product of an aromatic vinylconjugated diene block copolymer Kraton G1652 (trade name, produced by Shell Chemical Co.)
(c-2) Modified SEBS 1:
Prepared in the same manner as in Examples 1 to 10 was used.
(c-3) Modified SEBS 2: a hydrogenated product of a maleic anhydride-modified aromatic vinyl-conjugated diene block copolymer Kraton G1901X (trade name, produced by Shell Chemical Co.)
(c-8) Modified SEBS 3:
100 parts of a hydrogenated product of an aromatic vinylconjugated diene block copolymer Kraton G1651 (trade name, produced by Shell Chemical Co.), 2 parts of maleic anhydride as an unsaturated polar compound and 0.1 part of 1,3-bis(t-butylperoxyisopropyl)benzene Perkadox 14 (trade name, produced by Kayaku AKZO Co.) were sufficiently mixed by stirring using a super mixer. The mixture was melted and kneaded by using a TEX 44 biaxial extruder (trade name, manufactured by Nippon Seikosho Co.) under kneading conditions of a setting temperature of 180° C. and a screw rotary number of 200 rpm to prepare a resin composition. Then, the resin composition was pelletized and the resulting pellets were washed with acetone and then dried under reduced pressure to obtain a modified resin. As a result of measuring an infrared absorption spectrum of the modified resin, the graft polymerization amount of the unsaturated polar compound was 0.8% by weight.
Other components:

PEP 36: Bis (2,6-di-t-butyl-4-methylphenyl) pentaerythritol diphosphite Mark PEP-36 (trade name, produced by Asahi Denka Co., hereinafter referred to as "PEP 36")

Maleic anhydride: a commercially available maleic anhydride (reagent grade)

Epoxy compound: an epoxydized acrylamide compound Kaneka AXE (trade name, produced by Kanegafuchi Kagaku Kogyo Co.)

Components (a), (b) and (c) were sufficiently mixed by stirring using a super mixer according to the formulation ratios shown in Table 3. The mixtures were melted and kneaded by using a TEX 44 biaxial extruder (trade name, manufactured by Nippon Seikosho Co.) under conditions of a setting temperature of 230° C. and a screw rotary number of 350 rpm to prepare resin compositions. The resin compositions were pelletized.

The pellets of the above resin compositions were subjected to injection molding by using an inline screw type injection molding machine IS-90B Model (trade name, manufactured by Toshiba Kikai Seisakusho Co.) at a cylinder temperature of 280° C. and a mold cooling temperature of 80° C. to prepare test pieces.

At injection molding, drying was carried out until immediately before injection molding by using a reduced pressure dryer under conditions of 0.1 mmHg and 80° C. for 48 hours. The injection molded test pieces were placed in a desiccator immediately after molding and allowed to stand at 23° C. for 4 to 6 days, and then evaluation tests were conducted according to the following methods. The results are shown in Table 4.

Dispersed state of network (Method of calculating R), melt shear viscosity ratio, three-point flexural modulus, Izod impact strength and linear expansion coefficient were measured in the same manner as in Examples 1 to 10.

(6) Heat distortion temperature

Heat distortion temperature was measured according to JIS K 7207 by using an HDT tester (manufactured by Toyo Seiki Seisakusho Co.) with a load of 4.6 kg.

Figure 3:
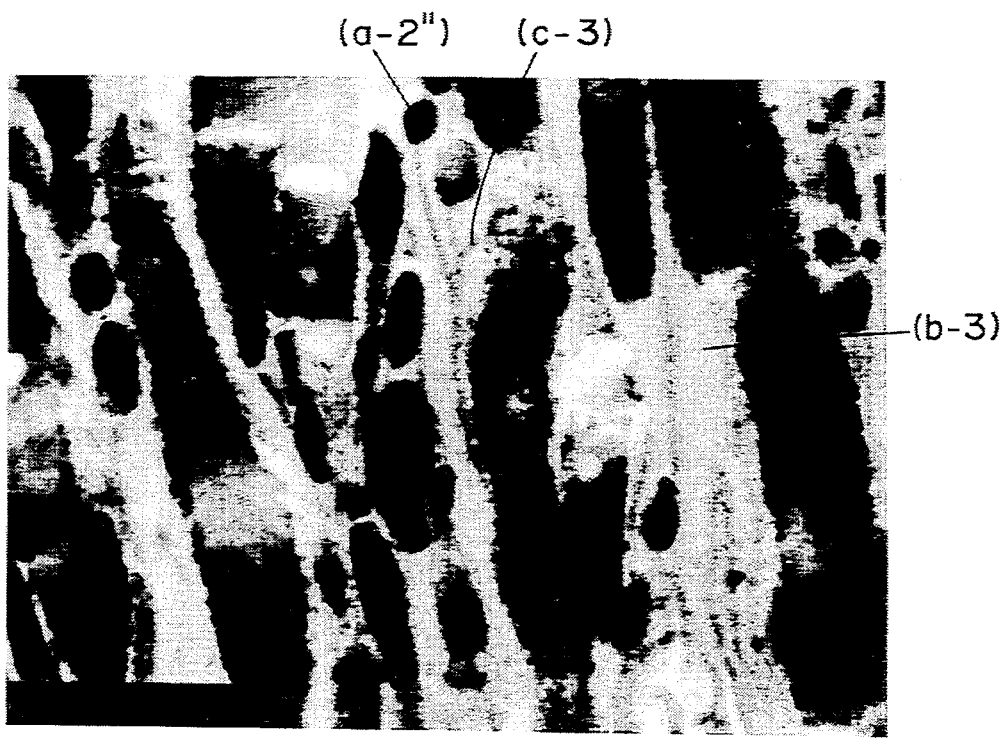
FIG. 3 is a transmission type electron microscope photograph (75,000 magnifications) of the composition obtained in Example 12.

A photograph of the composition obtained in Example 12 taken by using a transmission type electron microscope of 75,000 magnifications is shown in FIG. 3. Component (c) (Modified SEBS 2 in this composition) is observed as a black portion by dyeing and it can be seen that Component (c) forms a network structure. The number m of regions of Component (a) and/or Component (b) enclosed with Component (c) existing in a square having a side length of 1 μm is 21, and R is 0.45. Component (c) exists at the interface of Component (a) and Component (b) (Modified polyphenylene ether).

COMPARATIVE EXAMPLES 4 AND 5

Procedures were carried out in the same manner as in Examples 11 to 17 by using the respective components shown in Table 3 according to the formulation ratios shown in Table 3. The results are shown in Table 4.

COMPARATIVE EXAMPLE 6

Modified PPE (b-3') was prepared in the same manner as in the preparation of the modified PPE (b-3) except for using a PPE having an intrinsic viscosity of 0.51 dl/g in place of the PPE (b-1). Procedures were carried out in the same manner as in Example 12 according to the formulation ratio shown in Table 3 except for using the modified PPE (b-3') in place of the modified PPE (b-3) used in Example 12. The results are shown in Table 4.

COMPARATIVE EXAMPLE 7

Modified PPE (b-3") was prepared in the same manner as in the preparation of the modified PPE (b-3) except for using a PPE having an intrinsic viscosity of 0.57 dl/g in place of the PPE (b-1). Procedures were carried out in the same manner as in Example 12 according to the formulation ratio shown in Table 3 except for using the modified PPE (b-3") in place of the modified PPE (b-3) used in Example 12. The results are shown in Table 4.

Figure 4:
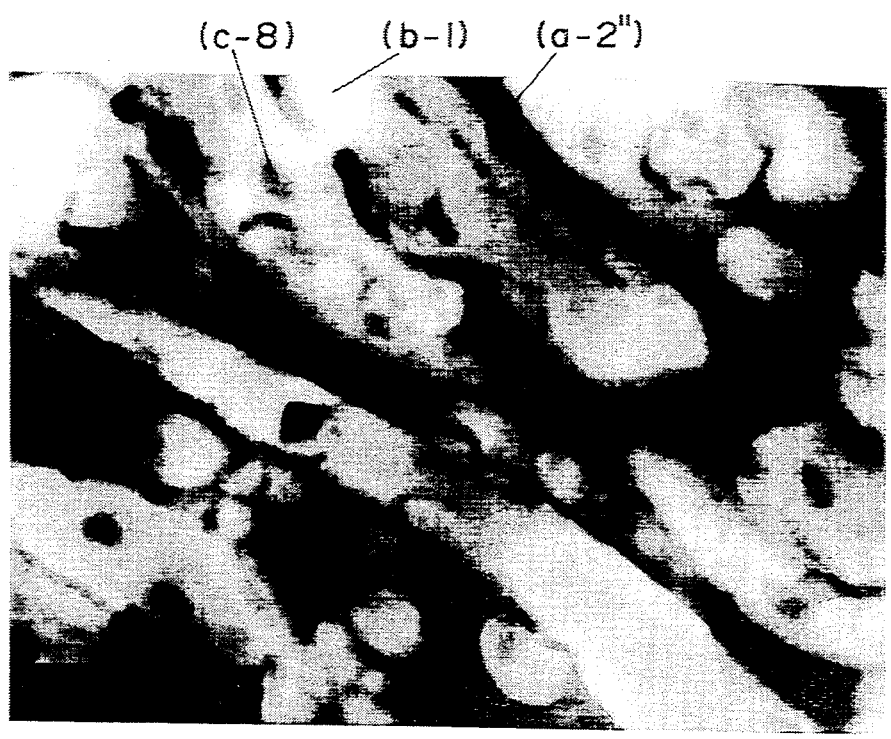
FIG. 4 is a transmission type electron microscope photograph (75,000 magnifications) of the composition obtained in Comparative example 5.

A photograph of the composition obtained in Comparative example 5 taken by using a transmission type electron microscope of 75,000 magnifications is shown in FIG. 4. Component (c) is dispersed in a particle state, Component (a) and/or Component (b) enclosed with Component (c) does not exist, and Component (c) does not exist at the interface of Component (a) and Component (b), but exists in Component (b).

TABLE 3

| Composition (part by weight) | | Example 11 | 12 | 13 | 14 | 15 | 16 | 17 | Comparative example 4 | 5 | 6 | 7 |
|---|---|---|---|---|---|---|---|---|---|---|---|---|
| Component (a) | | | | | | | | | | | | |
| Polybuthylene terephthalate | (a-1) | 49 | — | — | — | 50 | — | 49 | 55 | — | — | — |
| Polyamide 6 | (a-2") | — | 49 | — | — | — | 50 | — | — | 48 | 49 | 49 |
| Polyolefin | (a-3) | — | — | 50 | 10 | 19 | 19 | — | — | — | — | — |
| Component (b) | | | | | | | | | | | | |
| Polyphenylene ether | (b-1) | 20 | — | 20 | 60 | — | — | — | 36 | 33 | — | — |
| Polycarbonate | (b-2) | — | — | — | — | — | — | 20 | — | — | — | — |
| Modified polyphenylene ether | (b-3) | — | 21 | — | — | — | — | — | — | — | (b-3') 21 | (b-3") 21 |
| Component (c) | | | | | | | | | | | | |
| SEBS | (c-1) | — | — | 30 | 30 | — | — | — | — | — | — | — |
| Modified SEBS 1 | (c-2) | 30 | — | — | — | 30 | — | 30 | 8 | — | — | — |
| Modified SEBS 2 | (c-3) | — | 30 | — | — | — | 30 | — | — | — | 30 | 30 |
| Modified SEBS 3 | (c-8) | — | — | — | — | — | — | — | — | 18 | — | — |
| Other components | | | | | | | | | | | | |
| PEP 36 | | 1 | — | — | — | — | — | 1 | 1 | — | — | — |
| Maleic anhydride | | — | — | — | — | — | 1 | — | — | 1 | 1 | 1 |
| Epoxy compound | | — | — | — | — | 1 | — | — | — | — | — | — |
| Melt shear viscosity ratio | | | | | | | | | | | | |
| Component (c)/Component (a) | | 0.60 | 0.70 | 0.80 | 0.80 | 0.60*1 | 0.70*1 | 0.60 | 0.60 | 30.00 | 0.70 | 0.70 |
| Component (c)/Component (b) | | 0.30 | 0.16 | 0.30 | 0.30 | 0.80*2 | 0.43*2 | 0.13 | 0.30 | 6.90 | 0.02 | 0.01 |

TABLE 3-continued

| Composition (part by weight) | Example | | | | | | | Comparative example | | | |
|---|---|---|---|---|---|---|---|---|---|---|---|
| | 11 | 12 | 13 | 14 | 15 | 16 | 17 | 4 | 5 | 6 | 7 |
| Component (b)/Component (a) | 2.00 | 4.35 | 2.67 | 2.67 | 0.75*³ | 1.63*³ | 4.60 | 2.00 | 4.35 | 30.43 | 56.52 |

*¹: (c)/(a-1),
*²: (c)/(a-3),
*³: (a-3)/(a-1)

TABLE 4

| Evaluation results | Example | | | | | | | Comparative example | | | |
|---|---|---|---|---|---|---|---|---|---|---|---|
| | 11 | 12 | 13 | 14 | 15 | 16 | 17 | 4 | 5 | 6 | 7 |
| Network structure (R) | 0.55 | 0.45 | 0.48 | 0.79 | 0.77 | 0.60 | 0.80 | ∞* | ∞* | ∞* | ∞* |
| Three-point flexural modulus 23° C. (kg/cm²) | 15,500 | 17,700 | 5,000 | 10,500 | 14,500 | 15,000 | 16,200 | 23,500 | 18,900 | 18,300 | 18,500 |
| Izod impact strength** | | | | | | | | | | | |
| 23° C. (kg · cm/cm²) | NB 81 | NB 80 | NB 69 | NB 75 | NB 68 | NB 78 | NB 72 | 10 | NB 75 | NB 83 | NB 76 |
| −30° C. (kg · cm/cm²) | 18 | 22 | NB 103 | 10 | 10 | 12 | NB 45 | 4 | 18 | NB 42 | NB 25 |
| Linear expansion coefficient × 10⁻⁵ (l/°C.) | 8.3 | 7.5 | 7.4 | 6.1 | 9.1 | 8.5 | 8.2 | 12 | 11 | 12 | 11 |
| Heat distortion temperature 4.6 kgf (°C.) | 148 | 155 | 80 | 125 | 145 | 141 | 140 | 171 | 168 | 158 | 160 |

*: ∞ means that a network structure was not formed.
**: NB means that the test piece was not broken.

From the results of the evaluation tests described above, it can be understood that the thermoplastic resin composition of the present invention in which Component (c) forms a network in Component (a) and/or Component (b) and Component (c) exists substantially at the interface of Component (a) and Component (b) has excellent dimensional stability (low linear expansion coefficient) and an excellent balance between rigidity and impact resistance. Thus, the thermoplastic resin composition of the present invention can be used for various purposes, and it can be an industrially useful material.

EXAMPLES 18 TO 24

The following respective components were used.
Component (a):

(a-1) Saturated polyester: polybutylene terephthalate PBT128 (trade name, produced by Kanebo Co., flexural modulus (JIS K 7203): 25,000 kg/cm²)

(a-2) Polyamide: Polyamide 6 MC161 (trade name, produced by Kanebo Co., relative viscosity according to JIS K 6810: 6.8, flexural modulus (JIS K 7203): 27,000 kg/cm²)

(a-3) Polyolefin: a propylene-ethylene block copolymer BCSDQ (trade name, produced by Mitsubishi Petrochemical Co., Ltd., MFR according to JIS K 7210: 1.2 g/10 min, ethylene content by infrared spectroscopic analysis: 5.5% by weight, flexural modulus (JIS K 7203): 8,000 kg/cm²)

Component (b):

(b-1) Polyphenylene ether: poly(2,6-dimethyl-1,4-phenylene ether) (produced by way of trial by Nippon Polyether Co., intrinsic viscosity measured at 30° C. in chloroform: 0.30 dl/g, flexural modulus (JIS K 7203): 26,000 kg/cm²)

Component (c):

(c-1) SEBS: a hydrogenated product of an aromatic vinylconjugated diene block copolymer Kraton G1652 (trade name, produced by Shell Chemical Co., flexural modulus (JIS K 7203): 2,000 kg/cm²)

(c-2) Modified SEBS 1:
Prepared in the same manner as in Examples 1 to 10 was used.

(c-3) Modified SEBS 2: a hydrogenated product of a maleic anhydride-modified aromatic vinyl-conjugated diene block copolymer Kraton G1901X (trade name, produced by Shell Chemical Co., flexural modulus (JIS K 7203): 1,500 kg/cm²)

(c-4) Modified EPR: a maleic anhydride-modified ethylenepropylene rubber T7711SP (trade name, produced by Nihon Synthetic Rubber Co., maleic anhydride content: 0.5 to 1% by weight, flexural modulus (JIS K 7203): 700 kg/cm²)

Component (d):

(d-1) Talc: KT-300 (trade name, produced by Fuji Talc Co., average particle size: 1.5 μm)

(d-2) Potassium titanate: Tismo D102 (trade name, produced by Otsuka Kagaku Co.)

(d-3) Clay: KT-170 (trade name, produced by Kinseimatic Co., average particle size: 0.6 μm)

Component (a), Component (b) and Component (d) were previously melted and kneaded by using a TEX 44 biaxial extruder (trade name, manufactured by Nippon Seikosho Co.) under conditions of a setting temperature of 230° C. and a screw rotary number of 250 rpm according to the formulation ratios shown in Table 5, and the mixtures were pelletized. Then, the respective pellets and the remaining Component (c) were sufficiently mixed by stirring using a super mixer according to the formulation ratios shown in Table 5. The mixtures were melted and kneaded by using the above biaxial extruder under conditions of a setting temperature of 230° C., a screw rotary number of 350 rpm and a vent deaeration of 600 mmHg to prepare resin compositions. The resin compositions were pelletized.

The pellets of the above resin compositions were subjected to injection molding by using an inline screw type injection molding machine IS-90B Model (trade name, manufactured by Toshiba Kikai Seisakusho Co.) at a cylinder temperature of 280° C. and a mold cooling temperature of 80° C. to prepare test pieces.

At injection molding, drying was carried out until immediately before injection molding by using a reduced pressure dryer under conditions of 0.1 mmHg and 80° C. for 48 hours. The injection molded test pieces were placed in a desiccator immediately after molding and allowed to stand at 23° C. for 4 to 6 days, and then evaluation tests were conducted according to the following methods. The results are shown in Table 6.

Dispersed state of network (Method of calculating R), melt shear viscosity ratio, three-point flexural modulus, Izod impact strength, linear expansion coefficient and heat distortion temperature were measured in the same manner as in Examples 11 to 17.

Figure 5:
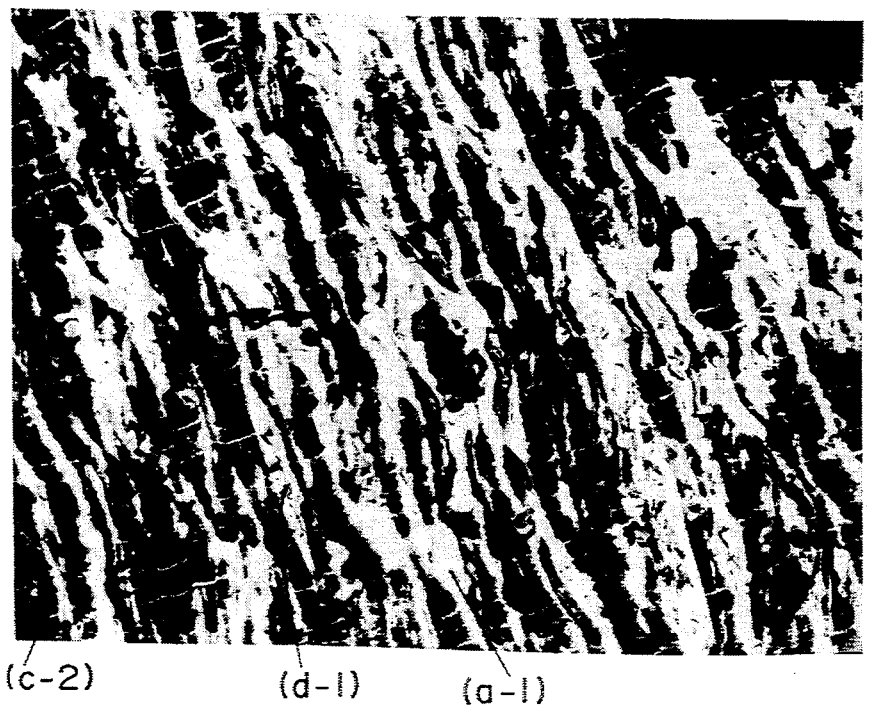
FIG. 5 is a transmission type electron microscope photograph (7,500 magnifications) of the composition obtained in Example 18.

A photograph of the composition obtained in Example 18 taken by using a transmission type electron microscope of 7,500 magnifications is shown in FIG. 5. It can be observed by dyeing that Component (c) (Modified SEBS 1 in this composition) forms a network structure. The number m of regions of Component (a) (polybutylene terephthalate) enclosed with Modified SEBS 1 is 18, and R is 0.49. Component (d) (talc) exists in Component (a).

EXAMPLE 25

Procedures were carried out in the same manner as in Examples 18 to 24 according to the formulation ratio shown in Table 5 except for mixing Components (a), (c) and (d) simultaneously by stirring using a super mixer. The results are shown in Table 6.

Figure 6:
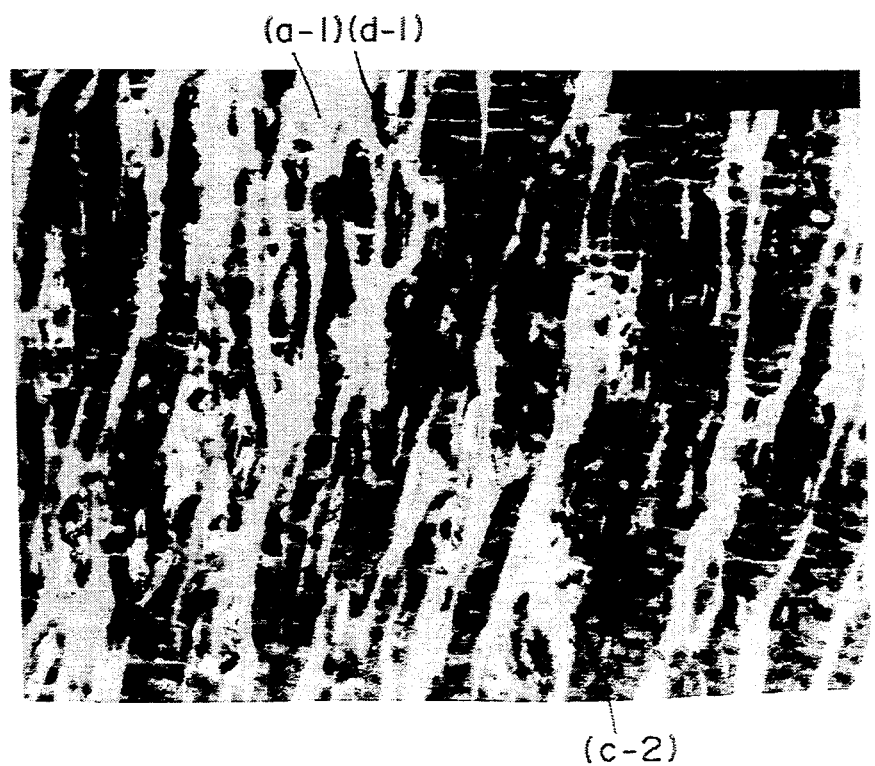
FIG. 6 is a transmission type electron microscope photograph (7,500 magnifications) of the composition obtained in Example 25.

A photograph of the composition obtained in Example 25 taken by using a transmission type electron microscope of 7,500 magnifications is shown in FIG. 6. It can be seen that Component (d) is observed as a white portion and exists in Component (c).

position of the present invention in which Component (c) having flexural modulus smaller than that of Component (a) or Component (b) forms a network in Component (a) or Component (b), and Component (d) exists substantially in Component (a) or Component (b) has excellent dimensional stability (low linear expansion coefficient) and an excellent balance between rigidity and impact resistance. Thus, the thermoplastic resin composition of the present invention can be used for various purposes, and it can be an industrially useful material.

EXAMPLES 26 TO 32

The following respective components were used.
Component (a):
(a-1) Saturated polyester: polybutylene terephthalate PBT128 (trade name, produced by Kanebo Co.)
(a-2") Polyamide: Polyamide 6, MC112L (trade name, produced by Kanebo Co., relative viscosity according to JIS K 6810: 2.7)
(a-3) Polyolefin: a propylene-ethylene block copolymer BCSDQ (trade name, produced by Mitsubishi Petrochemical Co., Ltd., MFR according to JIS K 7210: 1.2 g/10 min, ethylene content by infrared spectroscopic analysis: 5.5% by weight)
Component (b):
(b-1) Polyphenylene ether: poly (2,6-dimethyl-1,4-phenylene ether) (produced by way of trial by Nippon

TABLE 5

| Composition (part by weight) | | Example | | | | | | | |
|---|---|---|---|---|---|---|---|---|---|
| | | 18 | 19 | 20 | 21 | 22 | 23 | 24 | 25 |
| Component (a) | | | | | | | | | |
| Polybuthylene terephthalate | (a-1) | 54 | — | — | — | — | — | — | 57 |
| Polyamide 6 | (a-2) | — | 51 | 49 | — | — | 55 | 47 | — |
| Polyolefin | (a-3) | — | — | — | 60 | — | — | — | — |
| Component (b) | | | | | | | | | |
| Polyphenylene ether | (b-1) | — | — | — | — | 45 | — | — | — |
| Component (c) | | | | | | | | | |
| SEBS | (c-1) | — | — | — | 30 | 30 | — | — | — |
| Modified SEBS 1 | (c-2) | 36 | — | — | — | — | — | — | 36 |
| Modified SEBS 2 | (c-3) | — | 34 | — | — | — | 38 | 33 | — |
| Modified EPR | (c-4) | — | — | 39 | — | — | — | — | — |
| Component (d) | | | | | | | | | |
| Talc | (d-1) | 10 | 15 | 12 | 10 | 10 | — | — | 10 |
| Potassium titanate | (d-2) | — | — | — | — | — | 7 | — | — |
| Clay | (d-3) | — | — | — | — | — | — | 20 | — |
| Melt shear viscosity ratio Component (c)/Component (a) or (b) | | 0.6 | 0.07 | 0.3 | 0.8 | 0.5 | 0.07 | 0.07 | 0.6 |
| Flexural modulus ratio $M_a/M_c$ or $M_b/M_c$ | | 12.5 | 18.0 | 38.6 | 5.3 | 13.0 | 18.0 | 18.0 | 12.5 |

TABLE 6

| Evaluation results | Example | | | | | | | |
|---|---|---|---|---|---|---|---|---|
| | 18 | 19 | 20 | 21 | 22 | 23 | 24 | 25 |
| Network structure (R) | 0.49 | 0.45 | 0.40 | 0.73 | 0.80 | 0.46 | 0.51 | 0.49 |
| Filler-existing place | Component (a) | Component (a) | Component (a) | Component (a) | Component (b) | Component (a) | Component (a) | Component (c) |
| Three-point flexural modulus 23° C. (kg/cm$^2$) | 15,300 | 17,600 | 9,800 | 10,000 | 16,500 | 15,700 | 16,300 | 11,300 |
| Izod impact strength** | | | | | | | | |
| 23° C. (kg · cm/cm$^2$) | NB 91 | NB 97 | NB 95 | NB 80 | NB 85 | NB 97 | NB 89 | NB 95 |
| −30° C. (kg · cm/cm$^2$) | 15 | 11 | NB 65 | NB 35 | 18 | 25 | 9 | 12 |
| Linear expansion coefficient × 10$^{-5}$ (l/°C.) | 9.5 | 7.3 | 6.8 | 6.7 | 4.8 | 7.9 | 7.5 | 11.0 |
| Heat distortion temperature 4.6 kgf (°C.) | 85 | 98 | 92 | 58 | 128 | 92 | 88 | 57 |

*: ∞ means that a network structure was not formed.
**: NB means that the test piece was not broken.

From the results of the evaluation tests described above, it can be understood that the thermoplastic resin com- Polyether Co., intrinsic viscosity measured at 30° C. in chloroform: 0.30 dl/g)

(b-2) Polycarbonate: polycarbonate Upiron E-2000 (trade name, produced by Mitsubishi Gas Kagaku Co.)

(b-3) Modified polyphenylene ether:

Modified polyphenylene ether was prepared in the same manner as in Examples 11 to 17.

Component (c):

(c-1) SEBS: a hydrogenated product of an aromatic vinylconjugated diene block copolymer Kraton G1652 (trade name, produced by Shell Chemical Co.)

(c-2) Modified SEBS 1:

Prepared in the same manner as in Examples 1 to 10 was used.

(c-3) Modified SEBS 2: a hydrogenated product of a maleic anhydride-modified aromatic vinyl-conjugated diene block copolymer Kraton G1901X (trade name, produced by Shell Chemical Co.)

Component (d):

(d-1) Talc: KT-300 (trade name, produced by Fuji Talc Co., average particle size: 1.5 μm)

(d-2) Potassium titanate: Tismo D102 (trade name, produced by Otsuka Kagaku Co.)

(d-3) Clay: KT-170 (trade name, produced by Kinseimatic Co., average particle size: 0.6 μm)

Other components:

PEP 36: Bis (2,6-di-t-butyl-4-methylphenyl)pentaerythritol diphosphite Mark PEP-36 (trade name, produced by Asahi Denka Co., hereinafter referred to as "PEP 36")

Maleic anhydride: a commercially available maleic anhydride (reagent grade)

Component (a) and Component (d) were previously melted and kneaded by using a TEX 44 biaxial extruder (trade name, manufactured by Nippon Seikosho Co.) under conditions of a setting temperature of 230° C. and a screw rotary number of 250 rpm according to the formulation ratios shown in Table 7, and the mixtures were pelletized. Then, the respective pellets and the remaining Components (b) and (c) were sufficiently mixed by stirring using a super mixer according to the formulation ratios shown in Table 7. The mixtures were melted and kneaded by using the above biaxial extruder under conditions of a setting temperature of 230° C., a screw rotary number of 350 rpm and a vent deaeration of 600 mmHg to prepare resin compositions. The resin compositions were pelletized.

The pellets of the above resin compositions were subjected to injection molding by using an inline screw type injection molding machine IS-90B Model (trade name, manufactured by Toshiba Kikai Seisakusho Co.) at a cylinder temperature of 280° C. and a mold cooling temperature of 80° C. to prepare test pieces.

At injection molding, drying was carried out until immediately before injection molding by using a reduced pressure dryer under conditions of 0.1 mmHg and 80° C. for 48 hours.

The injection molded test pieces were placed in a desiccator immediately after molding and allowed to stand at 23° C. for 4 to 6 days, and then evaluation tests were conducted according to the following methods. The results are shown in Table 8.

Dispersed state of network (Method of calculating R), melt shear viscosity ratio, three-point flexural modulus, Izod impact strength, linear expansion coefficient and heat distortion temperature were measured in the same manner as in Examples 11 to 17.

Figure 7:
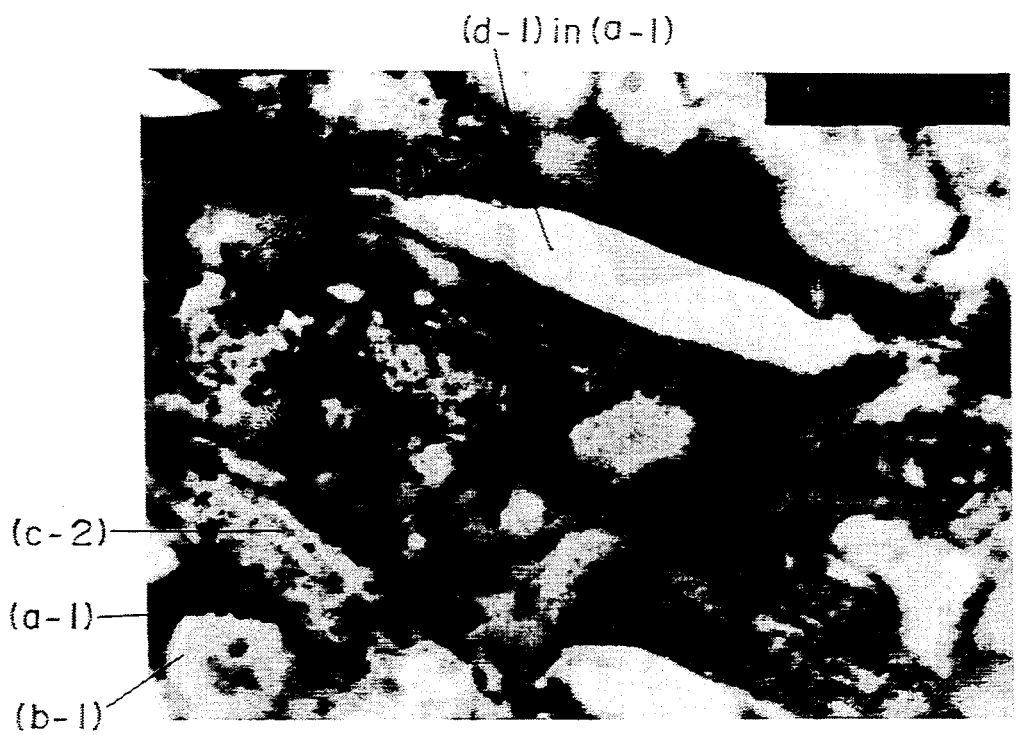
FIG. 7 is a transmission type electron microscope photograph (75,000 magnifications) of the composition obtained in Example 26.

A photograph of the composition obtained in Example 26 taken by using a transmission type electron microscope of 75,000 magnifications is shown in FIG. 7. It can be observed by dyeing that Component (c)(Modified SEBS 1 in this composition) forms a network structure. The number m of regions of polybutylene terephthalate and/or polyphenylene ether enclosed with Modified SEBS 1 is 12, and R is 0.56.

COMPARATIVE EXAMPLE 8

Procedures were carried out in the same manner as in Examples 25 to 31 according to the formulation ratio shown in Table 7 except for using the following Modified SEBS 3 (c-8) prepared in the same manner as in Examples 11 to 17 as Component (c). The results are shown in Table 8.

EXAMPLE 33

Procedures were carried out in the same manner as in Examples 26 to 32 according to the formulation ratio shown in Table 7 except for mixing Components (a) to (d) simultaneously by stirring using a super mixer. The results are shown in Table 8.

Figure 8:
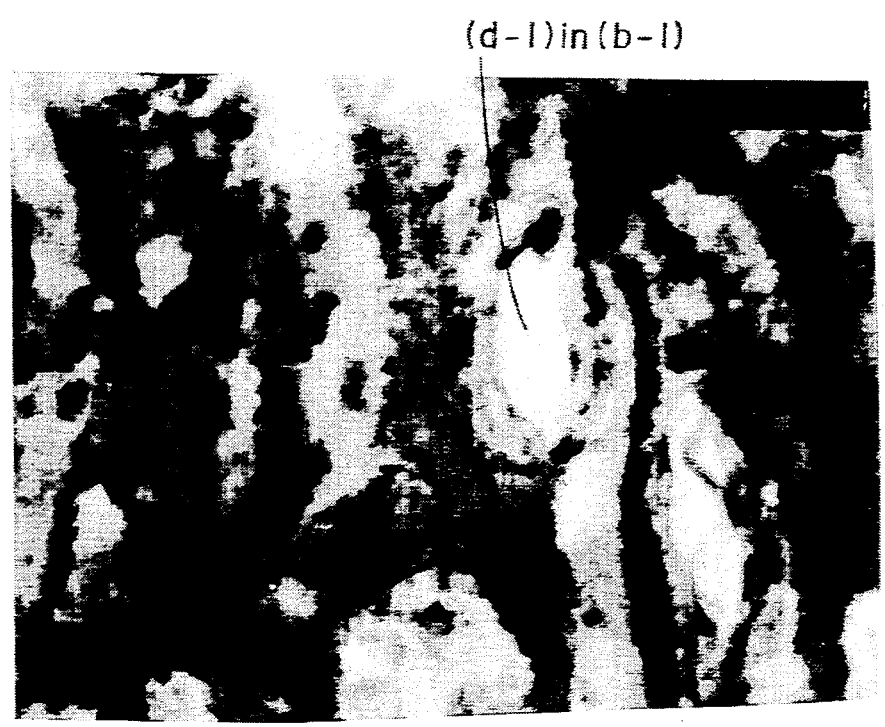
FIG. 8 is a transmission type electron microscope photograph (75,000 magnifications) of the composition obtained in Example 33.

A photograph of the composition obtained in Example 33 taken by using a transmission type electron microscope of 75,000 magnifications is shown in FIG. 8. It can be seen that Component (d) is observed as a white portion and exists in Component (b) and Component (c).

TABLE 7

| Composition (part by weight) | | Example 26 | 27 | 28 | 29 | 30 | 31 | 32 | 33 | Comparative example 8 |
|---|---|---|---|---|---|---|---|---|---|---|
| Component (a) | | | | | | | | | | |
| Polybuthylene terephthalate | (a-1) | 43 | — | — | — | — | 45 | — | 43 | — |
| Polyamide 6 | (a-2″) | — | 44 | — | 48 | 45 | — | 50 | — | 45 |
| Polyolefin | (a-3) | — | — | 45 | — | — | — | 10 | — | — |
| Component (b) | | | | | | | | | | |
| Polyphenylene ether | (b-1) | 14 | — | 15 | — | — | — | — | 14 | — |
| Polycarbonate | (b-2) | — | — | — | — | — | 20 | — | — | — |
| Modified polyphenylene ether | (b-4) | — | 14 | — | 14 | 12 | — | — | — | 25 |
| Component (c) | | | | | | | | | | |
| SEBS | (c-1) | — | — | 30 | — | — | — | — | — | — |
| Modified SEBS 1 | (c-2) | 29 | — | — | — | — | — | 29 | 29 | — |
| Modified SEBS 2 | (c-3) | — | 30 | — | 30 | 27 | 25 | — | — | — |
| Modified SEBS | (c-8) | — | — | — | — | — | — | — | — | 18 |
| Component (d) | | | | | | | | | | |
| Talc | (d-1) | 13 | 12 | 10 | — | — | 9 | 10 | 13 | 12 |
| Potassium titanate | (d-2) | — | — | — | 8 | — | — | — | — | — |
| Clay | (d-3) | — | — | — | — | 16 | — | — | — | — |
| Other components | | | | | | | | | | |
| PEP 36 | | 1 | — | — | — | — | 1 | — | 1 | — |

TABLE 7-continued

| Composition (part by weight) | Example 26 | 27 | 28 | 29 | 30 | 31 | 32 | 33 | Comparative example 8 |
|---|---|---|---|---|---|---|---|---|---|
| Maleic anhydride | — | — | — | — | — | — | 1 | — | — |
| Melt shear viscosity ratio Component (c)/Component (a) | 0.6 | 0.7 | 0.8 | 0.07 | 0.07 | 0.6 | 0.07*1 | 0.6 | 30 |

*1: Component (c)/(a-2")

TABLE 8

| Evaluation results | Example 26 | 27 | 28 | 29 | 30 | 31 | 32 | 33 | Comparative example 8 |
|---|---|---|---|---|---|---|---|---|---|
| Network structure (R) | 0.56 | 0.45 | 0.48 | 0.45 | 0.45 | 0.55 | 0.62 | 0.56 | ∞* |
| Filler-existing place | Component (a) | Component (a) | Component (a) | Component (a) | Component (a) | Component (a) | Component (a) | Components (b) and (c) | Component (a) |
| Three-point flexural modulus 23° C. (kg/cm$^2$) | 17,300 | 19,500 | 8,800 | 18,500 | 17,600 | 18,000 | 17,800 | 16,000 | 23,200 |
| Izod impact strength** | | | | | | | | | |
| 23° C. (kg · cm/cm$^2$) | NB 79 | NB 96 | NB 31 | NB 70 | NB 91 | NB 81 | 35 | 21 | 20 |
| −30° C. (kg · cm/cm$^2$) | 10 | 12 | 9 | 8 | 12 | 17 | 7 | 6 | 9 |
| Linear expansion coefficient × 10$^{-5}$ (l/°C.) | 6.9 | 6.6 | 5.9 | 5.9 | 7.5 | 7.1 | 6.8 | 8.3 | 8.0 |
| Heat distortion temperature 4.6 kgf (°C.) | 158 | 165 | 105 | 170 | 158 | 153 | 158 | 141 | 181 |

*: ∞ means that a network structure was not formed.
**: NB means that the test piece was not broken.

From the results of the evaluation tests described above, it can be understood that the thermoplastic resin composition of the present invention in which Component (c) forms a network in Component (a) and/or Component (b), Component (c) exists substantially at the interface of Component (a) and Component (b), and Component (d) exists substantially in Component (a) has excellent dimensional stability (low linear expansion coefficient) and an excellent balance between rigidity and impact resistance. Thus, the thermoplastic resin composition of the present invention can be used for various purposes, and it can be an industrially useful material.

We claim:

1. thermoplastic resin composition which comprises: 30 to 97% by weight of
   (a) a crystalline thermoplastic resin component; and
   (b) a non-crystalline thermoplastic resin component; and
   3 to 70% by weight of (c) a rubbery polymer component which is ununiformly mixed with Component (a) and Component (b) and
   0 to 40% by weight of (d) an inorganic filler,
   wherein Component (c) forms a network and substantially exists at the interface of Component (a) and Component (b), and at least one of the ratio of flexural modulus of Component (a) to Component (c) and that of Component (b) to Component (c) is 5 or more.

2. The thermoplastic resin composition according to claim 1, wherein the composition satisfies at least one of the following conditions (i) and (ii) and also satisfies the conditions (iii):
   (i) when a melt shear viscosity ratio of Component (c)/Component (a) is 0.1 to less than 1.0, the content of Component (c) based on the total weight of (a)+(b)+(c) is 25 to 70% by weight; when the ratio of the same is 0.01 to less than 0.1, the content of Component (c) is 15 to 65% by weight; and when the ratio of the same is less than 0.01, the content of Component (c) is 5 to 50% by weight, and
   (ii) when a melt shear viscosity ratio of Component (c)/Component (b) is 0.1 to less than 1.0, the content of Component (c) based on the total weight of (a)+(b)+(c) is 25 to 70% by weight; when the ratio of the same is 0.01 to less than 0.1, the content of Component (c) is 15 to 65% by weight; and when the ratio of the same is less than 0.01, the content of Component (c) is 5 to 50% by weight, and
   (iii) the melt shear viscosity ratio of Component (b)/Component (a) is 30/1 to 1/30.

3. The thermoplastic resin composition according to claim 11, wherein the composition satisfies at least one of the following conditions (i) and (ii) and also satisfies the condition (iii):
   (i) when a melt shear viscosity ratio of Component (c)/Component (a) is 0.1 to less than 1.0, the content of Component (c) based on the total weight of (a)+(b)+(c) is 25 to 60% by weight; when the ratio of the same is 0.01 to less than 0.1, the content of Component (c) is 15 to 60% by weight; and when the ratio of the same is less than 0.01, the content of Component (c) is 10 to 50% by weight,
   (ii) when a melt shear viscosity ratio of component (c)/component (b) is 0.1 to less than 1.0, the content of Component (c) based on the total weight of (a)+(b)+(c) is 25 to 60% by weight; when the ratio of the same is 0.01 to less than 0.1, the content of Component (c) is 15 to 60% by weight; and when the ratio of the same is less than 0.01, the content of Component (c) is 10 to 50% by weight, and
   (iii) the melt shear viscosity ratio of Component (b)/Component (a) is 15/1 to 1/15.

4. The composition according to claim 1, wherein said composition has a structure that the number m of regions of Component (a) and/or Component (b) which are enclosed with the network of Component (c) existing in a square having a side length of 1 μm is a number which makes the average value of the index R of the following formula (I) 0.9 or less, $$R = \frac{1}{\sqrt{2}\sqrt{m}} \cdot \frac{(2+\sqrt{2})^{1+\sqrt{m}} + (2-\sqrt{2})^{1+\sqrt{m}} - 2^{2+\sqrt{m}}}{(2+\sqrt{2})^{\sqrt{m}} - (2-\sqrt{2})^{\sqrt{m}}}. \tag{I}$$

5. The composition according to claim 1, wherein Component (a) comprises at least one crystalline thermoplastic resin selected from the group consisting of a saturated polyester, a polyamide, a polyolefin, a polyphenylene sulfide and a polyacetal.

6. The composition according to claim 1, wherein Component (b) comprises at least one non-crystalline thermoplastic resin selected from the group consisting of a polyphenylene ether, a polycarbonate and a polystyrene resin.

7. The composition according to claim 1, wherein Component (c) is a rubbery polymer having a flexural modulus of 10,000 kg/cm$^2$ or less.

8. The composition according to claim 1, wherein Component (c) comprises at least one rubbery polymer of a hydrogenated product of a block copolymer comprising an aromatic vinyl compound polymer block and a conjugated diene compound polymer block, a polyolefin rubbery copolymer or a graft-modified product thereof.

9. The composition according to claim 1, wherein Component (d) comprises at least one inorganic filler selected from the group consisting of talc, mica, kaolin, clay, diatomaceous earth and a glass fiber.

10. The composition according to claim 1, wherein said composition has at least one melt shear viscosity ratio of Component (c) to Component (a) and Component (c) to Component (b) of 1.0 or less.

11. A thermoplastic resin composition which comprises:
(a) 5 to 85% by weight of a crystalline thermoplastic resin component,
(b) 5 to 85% by weight of a non-crystalline thermoplastic resin component which is ununiformly mixed with Component (a),
(c) 10 to 60% by weight of a rubbery polymer component which is ununiformly mixed with Component (a) and Component (b) and
(d) 0 to 40% by weight of an inorganic filler, wherein Component (c) forms a network and exists substantially at the interface of Component (a) and Component (b).

12. The composition according to claim 11, wherein said composition comprises:
(a) 7 to 75% by weight of the crystalline thermoplastic resin component,
(b) 10 to 70% by weight of the non-crystalline thermoplastic resin component,
(c) 10 to 55% by weight of the rubbery polymer component and
(d) 0 to 35% by weight of the inorganic filler.

13. The composition according to claim 11, wherein said composition comprises:
(a) 10 to 65% by weight of the crystalline thermoplastic resin component,
(b) 15 to 50% by weight of the a non-crystalline thermoplastic resin component,
(c) 12 to 40% by weight of the rubbery polymer and
(d) 0 to 25% by weight of the inorganic filler.

14. The composition according to claim 11, wherein said composition has a structure that the number m of regions of Component (a) and/or Component (b) which are enclosed with the network of Component (c) existing in a square having a side length of 1 μm is a number which makes the average value of the index R of the following formula (I) 0.9 or less, $$R = \frac{1}{\sqrt{2}\sqrt{m}} \cdot \frac{(2+\sqrt{2})^{1+\sqrt{m}} + (2-\sqrt{2})^{1+\sqrt{m}} - 2^{2+\sqrt{m}}}{(2+\sqrt{2})^{\sqrt{m}} - (2-\sqrt{2})^{\sqrt{m}}}. \tag{I}$$

15. The composition according to claim 11, wherein Component (d) substantially exists in Component (a).

16. The composition according to claim 11, wherein Component (a) comprises at least one crystalline thermoplastic resin selected from the group consisting of a saturated polyester, a polyamide, a polyolefin, a polyphenylene sulfide and a polyacetal.

17. The composition according to claim 11, wherein Component (b) comprises at least one non-crystalline thermoplastic resin selected from the group consisting of a polyphenylene ether, a polycarbonate and a polystyrene resin.

18. The composition according to claim 11, wherein Component (c) is a rubbery polymer having a flexural modulus of 10,000 kg/cm$^2$ or less.

19. The composition according to claim 11, wherein Component (c) comprises at least one rubbery polymer of a hydrogenated product of a block copolymer comprising an aromatic vinyl compound polymer block and a conjugated diene compound polymer block, a polyolefin rubbery copolymer or a graft-modified product thereof.

20. The composition according to claim 11, wherein Component (d) comprises at least one inorganic filler selected from the group consisting of talc, mica, kaolin, clay, diatomaceous earth and a glass fiber.

21. The composition according to claim 11, wherein said composition has melt shear viscosity ratios of Component (c) to Component (a) and Component (c) to Component (b) of 1.0 or less.

* * * * *